United States Patent
Huang et al.

(10) Patent No.: US 10,719,847 B2
(45) Date of Patent: Jul. 21, 2020

(54) METHOD FOR DETERMINING VALIDITY OF DELIVERING OF PROMOTION INFORMATION, MONITORING SERVER AND TERMINAL

(71) Applicant: TENCENT TECHNOLOGY (SHENZHEN) COMPANY LIMITED, Shenzhen (CN)

(72) Inventors: Lin Huang, Shenzhen (CN); Yuanhai Tang, Shenzhen (CN); Kongsuo Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 410 days.

(21) Appl. No.: 15/632,285

(22) Filed: Jun. 23, 2017

(65) Prior Publication Data

US 2017/0293934 A1 Oct. 12, 2017

Related U.S. Application Data

(63) Continuation of application No. PCT/CN2016/079078, filed on Apr. 12, 2016.

(30) Foreign Application Priority Data

May 11, 2015 (CN) .......................... 2015 1 0236298

(51) Int. Cl.
  *G06Q 30/02* (2012.01)
  *G06Q 50/00* (2012.01)

(52) U.S. Cl.
  CPC ..... *G06Q 30/0246* (2013.01); *G06Q 30/0254* (2013.01); *G06Q 50/01* (2013.01)

(58) Field of Classification Search
  CPC combination set(s) only.
  See application file for complete search history.

(56) References Cited

U.S. PATENT DOCUMENTS 7,065,500 B2 * 6/2006 Singh .................. G06Q 10/087
  705/26.1
9,462,083 B1 * 10/2016 Zhuge .................... H04L 67/10
(Continued)

FOREIGN PATENT DOCUMENTS

CN 101226550 A 7/2008
CN 101631496 A 1/2010
(Continued)

OTHER PUBLICATIONS

Cheung, Ronnie et al, Effectiveness of Online Advertising—A Hong Kong Case Study, 2010, IEEE, p. 345-349 (Year: 2010).*
(Continued)

*Primary Examiner* — Marie P Brady
(74) *Attorney, Agent, or Firm* — Syncoda LLC; Feng Ma

(57) ABSTRACT

A method for determining effectiveness of placing promotion information includes: characteristic information sent by multiple terminals is received to obtain multiple pieces of characteristic information, the characteristic information being obtained by monitoring promotion information by the terminals respectively and the characteristic information including specified accounts of a social application or terminal information; statistics on a total number of exposures of and a total number of clicks on the promotion information is made based on the characteristic information; user attributes corresponding to the terminals are determined to obtain multiple user attributes based on the characteristic information; statistics on a number of hit exposures of the promotion information is made based on the multiple user attributes and a target user attribute of the promotion information; and effectiveness of placing the promotion infor-
(Continued)

mation is determined based on the number of hit exposures, the total number of exposures and the total number of clicks.

19 Claims, 8 Drawing Sheets

(56) References Cited

U.S. PATENT DOCUMENTS

| | | | |
|---|---|---|---|
| 9,734,246 B1* | 8/2017 | Lewis | G06F 16/951 |
| 2002/0107735 A1* | 8/2002 | Henkin | G06O 30/0255 |
| | | | 705/14.55 |
| 2003/0163370 A1 | 8/2003 | Chen | |
| 2005/0177417 A1 | 8/2005 | Koreyasu | |
| 2008/0189169 A1* | 8/2008 | Turpin | G06Q 30/02 |
| | | | 705/7.33 |
| 2011/0231262 A1 | 9/2011 | Fukuda | |
| 2013/0080911 A1* | 3/2013 | Klemm | G06F 16/958 |
| | | | 715/745 |
| 2014/0046769 A1 | 2/2014 | Tajima et al. | |
| 2014/0089104 A1 | 3/2014 | Nanba | |
| 2014/0207558 A1 | 7/2014 | Silberstein | |
| 2014/0278939 A1 | 9/2014 | Hotta et al. | |
| 2014/0317114 A1* | 10/2014 | Alla | G06Q 30/0204 |
| | | | 707/737 |
| 2016/0117626 A1* | 4/2016 | Baken | G06Q 30/02 |
| | | | 705/7.42 |
| 2016/0262681 A1* | 9/2016 | Patterson | A61B 5/165 |
| 2017/0293934 A1 | 10/2017 | Huang et al. | |

FOREIGN PATENT DOCUMENTS

| | | | | |
|---|---|---|---|---|
| CN | 102024219 | | 4/2011 | |
| CN | 102693501 A | | 9/2012 | |
| CN | 104035926 A | | 9/2014 | |
| CN | 104298719 A | | 1/2015 | |
| CN | 104572875 A | | 4/2015 | |
| CN | 104992342 A | | 10/2015 | |
| EP | 0592467 A1 | * | 4/1994 | ............. G06Q 30/02 |
| EP | 1208492 A4 | | 7/2002 | |
| JP | 2012173885 A | | 9/2012 | |
| JP | 2012242976 A | | 12/2012 | |
| JP | 2013242657 A | | 12/2013 | |
| JP | 2014038420 A | | 2/2014 | |
| JP | 2014182437 A | | 9/2014 | |
| KR | 20010085148 A | * | 9/2001 | |
| KR | 100819703 B1 | * | 4/2008 | |
| WO | 02084549 A1 | | 10/2002 | |
| WO | WO-2005003899 A2 | * | 1/2005 | ......... H04N 7/17318 |
| WO | WO-2015124024 A1 | * | 8/2015 | ............. G06Q 30/02 |
| WO | WO-2015141931 A1 | * | 9/2015 | ......... G06Q 30/0273 |

OTHER PUBLICATIONS

English translation of the Second Office Action of the Japanese application No. 2017-560868, dated Apr. 15, 2019.
International Search Report in international application No. PCT/CN2016/079078, dated Jul. 14, 2016.
English Translation of the Written Opinion of the International Search Authority in international application No. PCT/CN2016/079078, dated Jul. 14, 2016.
Notification of the Second Office Action of Chinese application No. 201510236298.0, dated Aug. 21, 2018.
English Translation of the Notification of the First Office Action of Japanese application No. 2017-560868, dated Sep. 3, 2018.
Notification of the First Office Action of Chinese application No. 201510236298.0 , dated Jan. 29, 2018.
English Translation of Notification of the First Office Action of Chinese application No. 201510236298.0 , dated Jan. 29, 2018.

* cited by examiner

METHOD FOR DETERMINING VALIDITY OF DELIVERING OF PROMOTION INFORMATION, MONITORING SERVER AND TERMINAL

CROSS-REFERENCE TO RELATED APPLICATIONS

This is a continuation application of International Patent Application No. PCT/CN2016/079078, filed on Apr. 12, 2016, which claims priority to Chinese Patent Application No. 201510236298.0 filed on May 11, 2015. The disclosures of these applications are incorporated by reference herein in their entirety.

BACKGROUND

Along with rapid development of the Internet, more and more users view multimedia information such as a web page, a video and music through the Internet, thus more and more promotion information is placed in the multimedia information, for example, the promotion information being an advertisement. Factors such as whether promotion information is viewed by a user or not, influence of the promotion information and a feedback brought to an information promoter by the promotion information may be adopted to evaluate effectiveness of placing the promotion information. Therefore, methods for determining effectiveness of placing promotion information become concerns of the vast majority of information promoters.

At present, an information promoter may embed promotion information into multimedia information for placing, and when a terminal plays the multimedia information, the terminal may send a promotion information acquisition request to a promotion information server to acquire the corresponding promotion information from the promotion information server, and display the promotion information to expose the promotion information. In addition, in a process of displaying the promotion information, the terminal may make statistics on a number of exposures of an a number of clicks on the promotion information, acquire characteristic information such as an Internet Protocol (IP) address of the terminal, a region where the terminal is located and exposure time of the promotion information on the terminal, and send the obtained number of exposures, number of clicks and characteristic information to a monitoring server to enable the monitoring server to make statistics on a total number of exposures of, total number of clicks on and characteristic information of the promotion information and determine effectiveness of placing the promotion information on the basis of the total number of exposures of, total number of clicks on and characteristic information of the promotion information.

If most of users viewing the promotion information are not target users of promotion information, audience users of the promotion information being called target users, most of the users may not pay attention to the promotion information when the promotion information is placed by the abovementioned method, no more feedbacks are brought to an information promoter, and determination accuracy of effectiveness of placing the promotion information is relatively lower.

SUMMARY

The disclosure relates to the technical field of Internet, and in particular to a method for determining effectiveness of placing promotion information, a monitoring server and a terminal.

Embodiments of the disclosure provide a method for determining effectiveness of placing promotion information, a monitoring server and a terminal. The technical solutions are implemented as follows.

On a first aspect, a method for determining effectiveness of placing promotion information is provided, which may include that:

characteristic information sent by multiple terminals is received to obtain multiple pieces of characteristic information, the multiple pieces of characteristic information being obtained by monitoring promotion information by the multiple terminals respectively and the multiple pieces of characteristic information including specified accounts of the social application or terminal information;

statistics on a total number of exposures of and a total number of clicks on the promotion information is made on the basis of the multiple pieces of characteristic information;

user attributes corresponding to the multiple terminals are determined on the basis of the multiple pieces of characteristic information to obtain multiple user attributes;

statistics on a number of hit exposures of the promotion information is made on the basis of the multiple user attributes and a target user attribute of the promotion information; and the effectiveness of placing the promotion information is determined on the basis of the number of hit exposures of the promotion information, the total number of exposures of the promotion information and the total number of clicks on the promotion information.

On a second aspect, a method for determining effectiveness of placing promotion information is provided, which may include that:

when an instruction for viewing multimedia information is received, promotion information placed in the multimedia information is displayed;

characteristic information of the promotion information is acquired in a display process of the promotion information, the characteristic information including specified accounts of the social application or terminal information; and the characteristic information is sent to a monitoring server to enable the monitoring server to determine effectiveness of placing the promotion information on the basis of the characteristic information.

On a third aspect, a monitoring server is provided, which may include:

a receiving module, configured to receive characteristic information sent by multiple terminals to obtain multiple pieces of characteristic information, the multiple pieces of characteristic information being obtained by monitoring promotion information by the multiple terminals respectively and the multiple pieces of characteristic information including specified accounts of the social application or terminal information;

a first statistical module, configured to make statistics on a total number of exposures of and a total number of clicks on the promotion information on the basis of the multiple pieces of characteristic information;

a first determination module, configured to determine user attributes corresponding to the multiple terminals to obtain multiple user attributes on the basis of the multiple pieces of characteristic information;

a second statistical module, configured to make statistics on a number of hit exposures of the promotion information on the basis of the multiple user attributes and a target user attribute of the promotion information; and a second determination module, configured to determine effectiveness of placing the promotion information on the basis of the number of hit exposures of the promotion information, the total number of exposures of the promotion information and the total number of clicks on the promotion information.

On a fourth aspect, a terminal is provided, which may include:

a display module, configured to, when an instruction for viewing multimedia information is received, display promotion information placed in the multimedia information;

an acquisition module, configured to acquire characteristic information of the promotion information in a display process of the promotion information, the characteristic information including specified accounts of the social application or terminal information; and a sending module, configured to send the characteristic information to a monitoring server to enable the monitoring server to determine effectiveness of placing the promotion information on the basis of the characteristic information.

On a fifth aspect, a monitoring server is provided, which may include:

one or more processors, and a memory connected with the one or more processors, the memory being configured to store instructions executable by the one or more processors, herein the one or more processors may be configured to execute the instructions stored in the memory, including instructions configured to execute the following operation that:

characteristic information sent by multiple terminals is received to obtain multiple pieces of characteristic information, the multiple pieces of characteristic information being obtained by monitoring promotion information by the multiple terminals respectively and the multiple pieces of characteristic information including specified accounts of the social application or terminal information;

statistics on a total number of exposures of and a total number of clicks on the promotion information is made on the basis of the multiple pieces of characteristic information;

user attributes corresponding to the multiple terminals are determined to obtain multiple user attributes on the basis of the multiple pieces of characteristic information;

statistics on a number of hit exposures of the promotion information is made on the basis of the multiple user attributes and a target user attribute of the promotion information; and effectiveness of placing the promotion information is determined on the basis of the number of hit exposures of the promotion information, the total number of exposures of the promotion information and the total number of clicks on the promotion information.

On a sixth aspect, a terminal is provided, which may include:

one or more processors, and a memory connected with the one or more processors, the memory being configured to store instructions executable by the one or more processors, herein the one or more processors may be configured to execute the instructions stored in the memory, including instructions configured to execute the following operation that:

when an instruction for viewing multimedia information is received, promotion information placed in the multimedia information is displayed;

characteristic information of the promotion information is acquired in a display process of the promotion information, the characteristic information including specified accounts of a social application or terminal information; and the characteristic information is sent to a monitoring server to enable the monitoring server to determine effectiveness of placing the promotion information on the basis of the characteristic information.

The technical solutions provided by the embodiment of the disclosure have the following beneficial effects: in the embodiment of the disclosure, the terminals may determine the characteristic information of the promotion information in the display process of the promotion information, the characteristic information including specified accounts of the social application or the terminal information, and then the monitoring server may determine the user attributes corresponding to the terminals according to the characteristic information sent by the terminals, determine whether users viewing the promotion information are target users or not on the basis of the user attributes of the terminals and the target user attribute, and further make the statistics on the number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

BRIEF DESCRIPTION OF THE DRAWINGS

In order to describe the technical solutions in the embodiment of the disclosure more clearly, the accompanying drawings which are required by description about the embodiment will be simply introduced below. Obviously, the accompanying drawings described below are only some embodiments of the disclosure, and those skilled in the art may further obtain other accompanying drawings according to these accompanying drawings without creative work.

DETAILED DESCRIPTION

In order to make a purpose, technical solutions and advantages of the disclosure clearer, an implementation mode of the disclosure will be further described below with reference to the accompanying drawings in detail.

Figure 1:
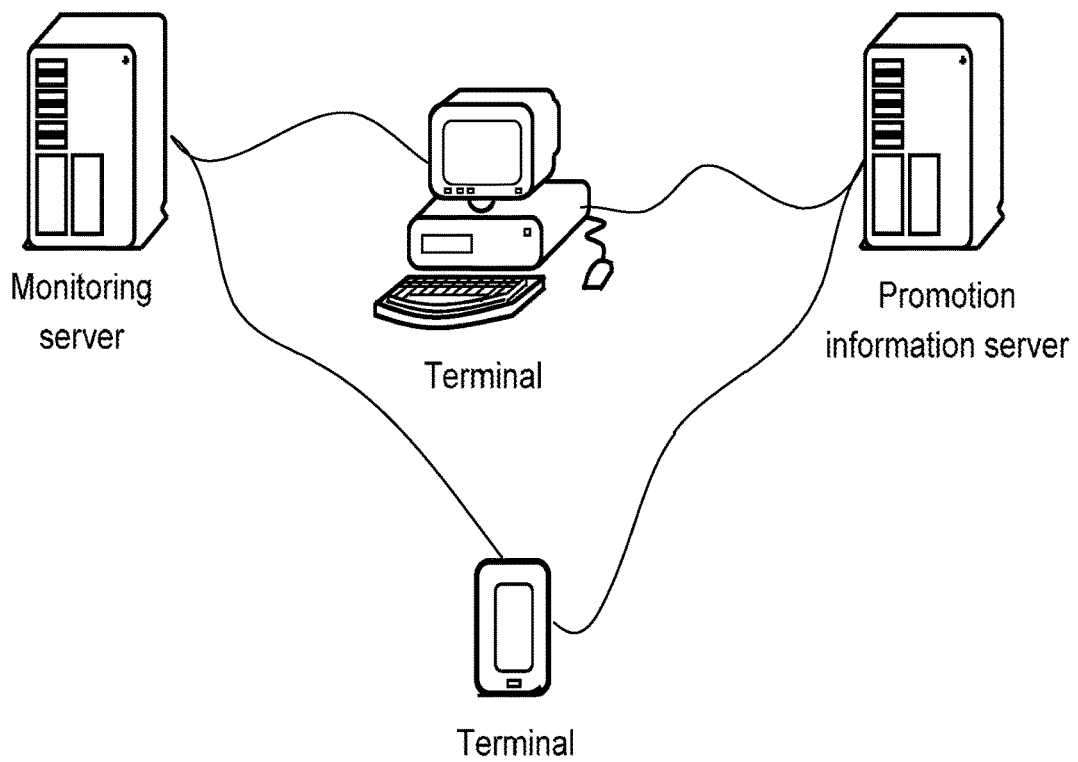
FIG. 1 is a structure diagram of a promotion information placing effectiveness determination system according to an embodiment of the disclosure.

FIG. 1 is a structure diagram of a promotion information placing effectiveness determination system, according to an embodiment of the disclosure. Referring to FIG. 1, the system includes multiple terminals, a monitoring server and a promotion information server. The multiple terminals are connected with the monitoring server through a network, the multiple terminals are also connected with the promotion information server through the network, the multiple terminals may be of different types, and for example, the types of the multiple terminals may be mobile terminals or fixed terminals; the monitoring server is configured to make statistics on a number of hit exposures, total number of exposures of and a total number of clicks on promotion information displayed by the multiple terminals to further determine effectiveness of placing the promotion information; and the promotion information server is configured to store the promotion information, herein the total number of exposures of the promotion information is a total number of times that the promotion information is displayed, the number of hit exposures of the promotion information is a number of times viewed by target users among the total number of exposures of the promotion information, that is, the number of hit exposures of the promotion information is a number of times that the promotion information is viewed by the target users, and the total number of clicks on the promotion information is a number of times that the promotion information is clicked by users, i.e. a number of times that users can click on the promotion information and access detailed information of the promotion information in a display process of the promotion information.

Figure 2:
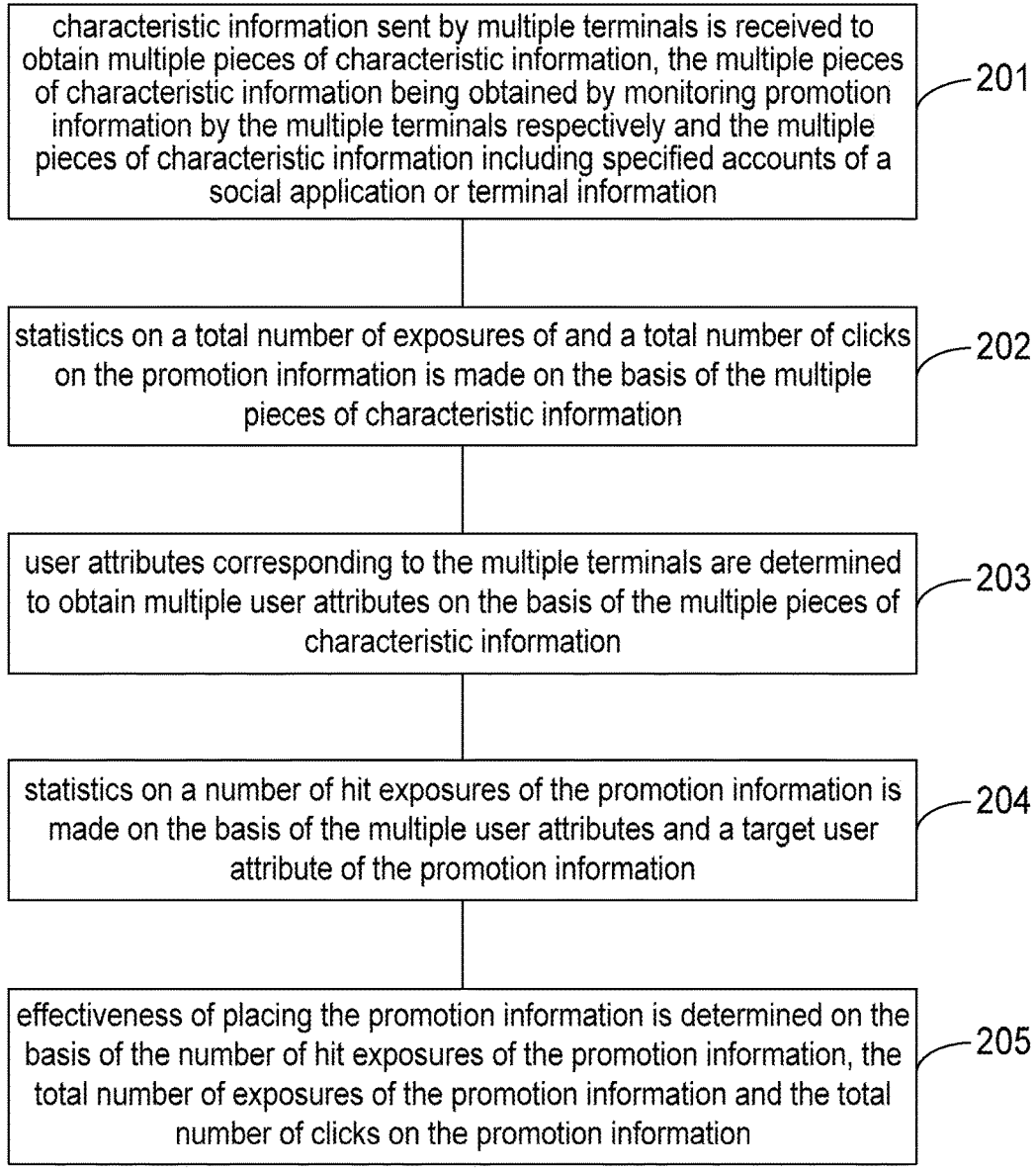
FIG. 2 is a flowchart of a method for determining effectiveness of placing promotion information according to an embodiment of the disclosure.

FIG. 2 is a flow chart showing a method for determining effectiveness of placing promotion information, according to an embodiment of the disclosure. Referring to FIG. 2, the method is applied to a server, and the method includes:

Step 201: characteristic information sent by multiple terminals is received to obtain multiple pieces of characteristic information, the multiple pieces of characteristic information being obtained by monitoring promotion information by the multiple terminals respectively and the multiple pieces of characteristic information including specified accounts of the social application or terminal information;

Step 202: statistics on a total number of exposures of and a total number of clicks on the promotion information is made on the basis of the multiple pieces of characteristic information;

Step 203: user attributes corresponding to the multiple terminals are determined to obtain multiple user attributes on the basis of the multiple pieces of characteristic information;

Step 204: statistics on a number of hit exposures of the promotion information is made on the basis of the multiple user attributes and a target user attribute of the promotion information; and Step 205: effectiveness of placing the promotion information is determined on the basis of the number of hit exposures of the promotion information, the total number of exposures of the promotion information and the total number of clicks on the promotion information.

In the embodiment of the disclosure, the terminals may determine the characteristic information of the promotion information in the display process of the promotion information, the characteristic information including specified accounts of the social application or the terminal information, and then the monitoring server may determine the user attributes corresponding to the terminals according to the characteristic information sent by the terminals, determine whether users viewing the promotion information are target users or not on the basis of the user attributes of the terminals and the target user attribute, and further make the statistics on the number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

Optionally, the step that the user attributes corresponding to the multiple terminals are determined to obtain the multiple user attributes on the basis of the multiple pieces of characteristic information includes that:

for each piece of characteristic information among the multiple pieces of characteristic information, a target specified account of the social application is determined on the basis of the characteristic information; and the user attributes corresponding to the terminals are acquired from stored correspondences between specified accounts of the social application and user attributes on the basis of the target specified accounts of the social application.

Optionally, the step that the target specified account of the social application is determined on the basis of the characteristic information includes that:

when the characteristic information is a specified account of the social application, the specified account of the social application is determined as the target specified account of the social application.

Optionally, the step that the target specified account of the social application is determined on the basis of the characteristic information includes that:

when the characteristic information is address information of a corresponding terminal, at least one specified account of the social application and a number of times that the at least one specified account of the social application has been logged on are acquired on the basis of the address information of the terminal from stored correspondences among address information, specified accounts of the social application and login times;

a specified account of the social application of which the login times is greatest is selected from the at least one specified account of the social application; and the selected specified account of the social application is determined as the target specified account of the social application.

Optionally, the step that the target specified account of the social application is determined on the basis of the characteristic information includes that:

when the characteristic information is a mobile terminal identifier of the corresponding terminal, at least one specified account of the social application and a timestamp of the at least one specified account of the social application are acquired on the basis of the mobile terminal identifier of the terminal from stored correspondences among mobile terminal identifiers, specified accounts of the social application and timestamps;

a specified account of the social application of which the timestamp is closest to current time is selected from the at least one specified account of the social application; and the selected specified account of the social application is determined as the target specified account of the social application.

Optionally, the step that the target specified account of the social application is determined on the basis of the characteristic information includes that:

when the characteristic information is a mobile terminal identifier of the corresponding terminal, at least one specified account of the social application and a number of times that the at least one specified account of the social application has been logged on are acquired on the basis of the mobile terminal identifier of the terminal from stored correspondences among mobile terminal identifiers, specified accounts of the social application and login times;

a specified account of the social application of which the login times is greatest is selected from the at least one specified account of the social application; and the selected specified account of the social application is determined as the target specified account of the social application.

Optionally, the step that the effectiveness of placing the promotion information is determined on the basis of the number of hit exposures of the promotion information, the total number of exposures of the promotion information and the total number of clicks on the promotion information includes that:

the number of hit exposures of the promotion information is divided by the total number of exposures of the promotion information to obtain a target user coverage rate of the promotion information;

the total number of clicks on the promotion information is divided by the total number of exposures of the promotion information to obtain a click rate of the promotion information;

a placing effectiveness index of the promotion information is calculated on the basis of the target user coverage rate of the promotion information and the click rate of the promotion information; and the effectiveness of placing the promotion information is determined on the basis of the placing effectiveness index of the promotion information.

Optionally, before the step that the statistics on the number of hit exposures of the promotion information is made on the basis of the multiple user attributes and the target user attribute of the promotion information, the method further includes that:

when an attribute setting instruction is received, a user attribute list is displayed;

an attribute selection instruction is received, the attribute selection instruction carrying a user attribute selected from the user attribute list by an information promoter; and the selected user attribute is determined as the target user attribute.

All of the optional technical solutions may be freely combined into optional embodiments of the disclosure, which will not be elaborated one by one in the embodiment of the disclosure.

Figure 3:
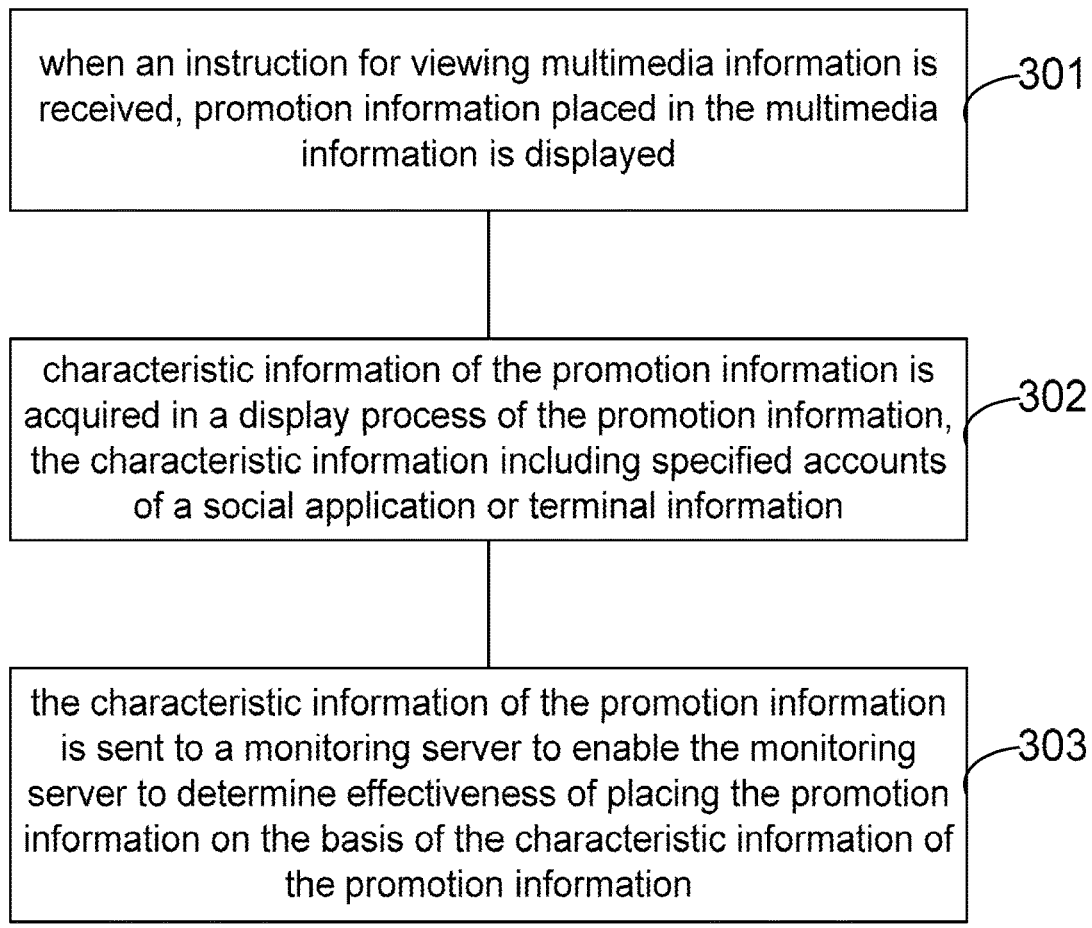
FIG. 3 is a flow chart of another method for determining effectiveness of placing promotion information according to an embodiment of the disclosure.

FIG. 3 is a flow chart showing a method for determining effectiveness of placing promotion information, according to an embodiment of the disclosure. Referring to FIG. 3, the method is applied to a terminal, and the method includes:

Step 301: when an instruction for viewing multimedia information is received, promotion information placed in the multimedia information is displayed;

Step 302: characteristic information of the promotion information is acquired in a display process of the promotion information, the characteristic information including a specified account of the social application or terminal information; and Step 303: the characteristic information of the promotion information is sent to a monitoring server to enable the monitoring server to determine effectiveness of placing the promotion information on the basis of the characteristic information of the promotion information.

In the embodiment of the disclosure, a terminal may determine the characteristic information of the promotion information in the display process of the promotion information, the characteristic information including the specified account of the social application or the terminal information, and then the monitoring server may determine a user attribute corresponding to the terminal according to the characteristic information sent by the terminal, determine whether a user viewing the promotion information is a target user or not on the basis of the user attribute of the terminal and a target user attribute, and further make statistics on a number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

Optionally, the step that the characteristic information of the promotion information is acquired in the display process of the promotion information includes that:

whether the specified account of the social application is currently logged on in a terminal or not is judged in the display process of the promotion information; and when the specified account of the social application is currently logged on in the terminal, the specified account of the social application currently logged on in the terminal is determined as the characteristic information of the promotion information.

Optionally, after the step that whether the specified account of the social application is currently logged on in the terminal or not is judged, the method further includes that:

when the specified account of the social application does not currently log in the terminal, a webpage cache is searched for the corresponding specified account of the social application according to a domain name of the social application;

if the corresponding specified account of the social application is found, the found specified account of the social application is determined as the characteristic information of the promotion information;

if the corresponding specified account of the social application is not found, the type of the terminal is determined;

when the terminal is a fixed terminal, address information of the terminal is determined as the characteristic information of the promotion information; and when the terminal is a mobile terminal, a mobile terminal identifier of the terminal is determined as the characteristic information of the promotion information.

All of the optional technical solutions may be freely combined into optional embodiments of the disclosure, which will not be elaborated one by one in the embodiment of the disclosure.

Figure 4:
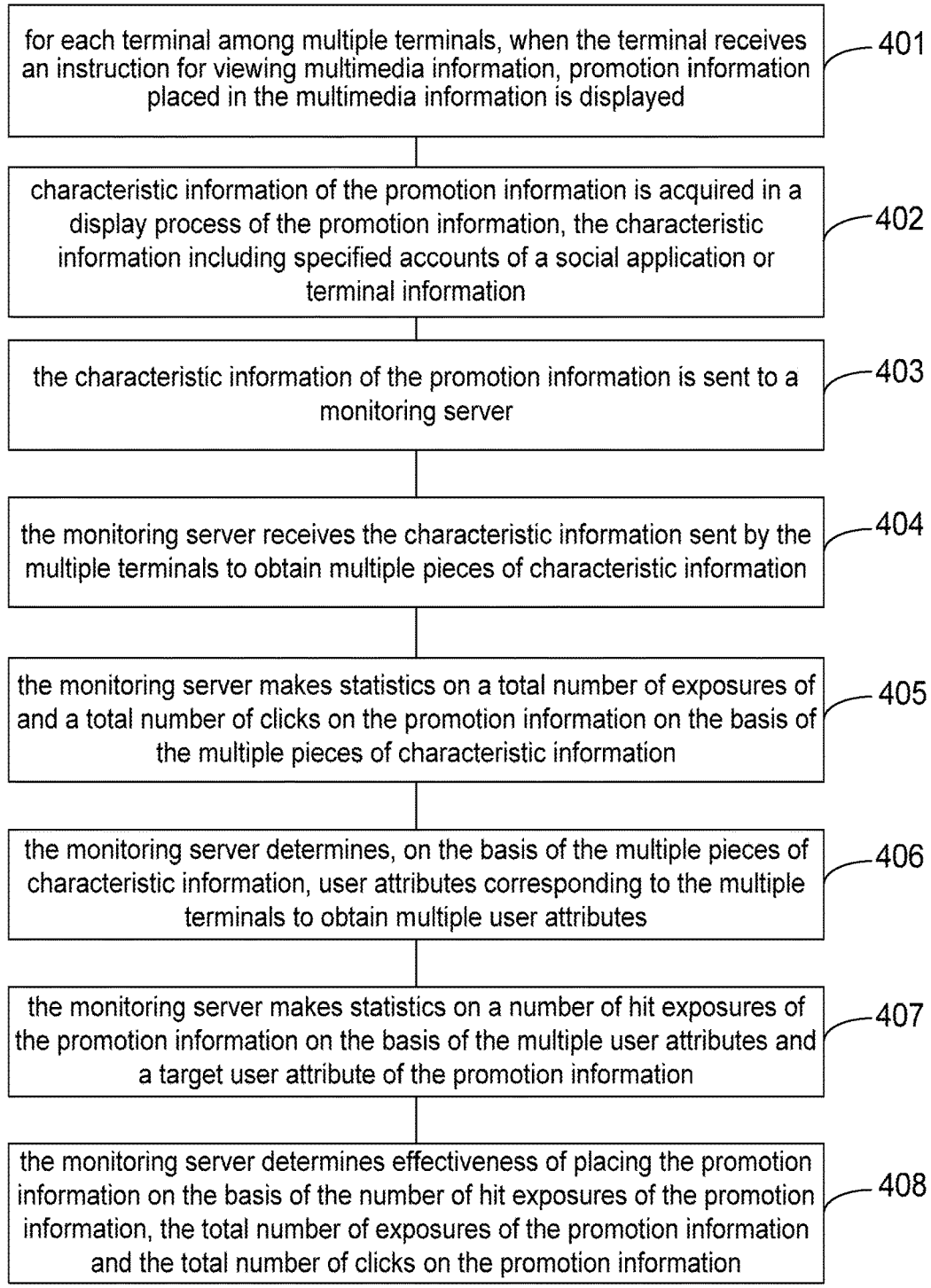
FIG. 4 is a flow chart of another method for determining effectiveness of placing promotion information according to an embodiment of the disclosure.

FIG. 4 is a flow chart showing a method for determining effectiveness of placing promotion information, according to an embodiment of the disclosure. Referring to FIG. 4, the method includes the following steps.

Step 401: for each terminal in multiple terminals, when the terminal receives an instruction for viewing multimedia information, promotion information placed in the multimedia information is displayed.

In the embodiment of the disclosure, a user may view the multimedia information through different types of terminals, and for example, the different types of terminals may be a mobile phone, an IPAD, a computer and the like, so that the promotion information placed in the multimedia information may also be displayed in different terminals, that is, the promotion information placed in the multimedia information may be displayed in multiple screens. Therefore, for each terminal displaying the promotion information, when the terminal receives the instruction for viewing the multimedia information, the terminal may display the promotion information placed in the multimedia information.

The promotion information may be displayed at the beginning or specified point in time of the multimedia information, and when the promotion information is displayed at the beginning of the multimedia information, the terminals may display the promotion information at first and then display the multimedia information after the promotion information is completely displayed; and when the promotion information is displayed at the specified point in time of the multimedia information, the terminals may display the multimedia information at first, then display the promotion information when a display time length of the multimedia information reach the specified point in time and continue displaying the multimedia information after the promotion information is completely displayed. In addition, different promotion information may be placed in different multimedia information, so that the operation that the terminal displays the promotion information placed in the multimedia information may be implemented as follows: the terminal searches locally stored correspondences between multimedia information identifiers and promotion information for corresponding promotion information on the basis of an identifier of the multimedia information, and if the corresponding promotion information is found, displays the found promotion information; if no corresponding promotion information is found, the terminal sends an information acquisition request to a promotion information server, the information acquisition request carrying the identifier of the multimedia information; and when the promotion information server receives the information acquisition request, the promotion information server acquires the corresponding promotion information from stored correspondences between multimedia information identifiers and promotion information, and sends the acquired promotion information to the terminal to enable the terminal to display the promotion information.

Furthermore, when the terminal receives the promotion information sent by the promotion information server, the terminal may further store the identifier of the multimedia information and the received promotion information in the local correspondences between multimedia information identifiers and promotion information.

It is important to note that a piece of promotion information may correspond to a piece of multimedia information or multiple pieces of different multimedia information, so that an identifier of multimedia information and acquired promotion information may be stored into the local correspondences between multimedia information identifiers and promotion information every time when the promotion information placed in the multimedia information is acquired from the promotion information server, and then when displaying the promotion information next time, the terminal is not required to acquire it from the promotion information server, and may directly acquire it from the locally stored correspondences between multimedia information identifiers and promotion information; and therefore, a number of times of interaction with the promotion information server is reduced, and a promotion information display speed is further increased.

In addition, in the embodiment of the disclosure, the instruction for viewing the multimedia information may be triggered by the user through first specified operation, and the first specified operation may be swipe operation, click operation, voice operation and the like, which is not specifically limited in the embodiment of the disclosure.

Step 402: characteristic information of the promotion information is acquired in a display process of the promotion information, the characteristic information including specified accounts of the social application or terminal information.

In order to determine effectiveness of placing the promotion information, the characteristic information of the promotion information may be acquired in the display process of the promotion information, which may specifically be implemented as follows: whether the specified accounts of the social application currently log in the terminals or not is judged in the display process of the promotion information; and when the specified accounts of the social application currently log in the terminals, the specified accounts of the social application currently logged on in the terminals are determined as the characteristic information of the promotion information.

Furthermore, when the specified accounts of the social application do not currently log in the terminals, webpage caches are searched for the corresponding specified accounts of the social application according to domain names of specified social applications; if the corresponding specified accounts of the social application are found, the found specified accounts of the social application are determined as the characteristic information of the promotion information; if the corresponding specified accounts of the social application are not found, it is determined that the webpage caches of the terminals are cleared, or, that the specified accounts of the social application have yet not logged in the terminals, and types of the terminals are determined; when the types of the terminals are fixed terminals, address information of the terminals is determined as the characteristic information of the promotion information; and when the types of the terminals are mobile terminals, mobile terminal identifiers of the terminals are determined as the characteristic information of the promotion information.

Herein, the operation that the webpage caches are searched for the corresponding specified accounts of the social application according to the domain names of the specified social applications may be implemented as follows: the terminals search correspondences between domain names in a webpage cache and specified accounts of the social application for the corresponding specified accounts of the social application according to the domain names of the specified social applications.

It is important to note that: if there are specified accounts of the social application currently logged on in the terminals, the specified accounts of the social application currently logged in the terminals may be directly determined as the characteristic information of the promotion information, then whether users viewing the promotion information are target users or not is determined according to the characteristic information of the promotion information, and accuracy of determining the effectiveness of placing the promotion information may further be improved.

In addition, if the specified accounts of the social application do not currently log in the terminals, the terminals may acquire the specified accounts of the social application which have been logged on in the terminals from historical records, and as mentioned above, may search the webpage caches for the corresponding specified accounts of the social application according to the domain names of the specified social applications, and the webpage caches are usually caches of viewing multimedia applications through a browser application, such as cookie, that is, a client application usually has no corresponding webpage cache, and for example, when net news is read through browsers, a terminal may usually include a webpage cache of the net news, while when the net news is read through a news client, the terminal may usually not include the webpage cache of the net news. Therefore, if the multimedia information is currently viewed through a browser application, the terminals may directly search the webpage caches of the browser application for the corresponding specified accounts of the social application according to the domain names of the specified social applications. If the multimedia information is currently viewed through a client application, the terminals may search the webpage caches of the corresponding browser application, thereby searching the webpage caches of the browser application for the corresponding specified accounts of the social application according to the domain names of the specified social applications.

Herein, the abovementioned webpage caches refer to caches configured to store webpage data when the multimedia information is viewed through webpages, and when the multimedia information is viewed through the client application, there exists no webpage cache, that is, the webpage caches exist for the webpages rather than clients, so that the terminals are required to search the webpage caches of the browser application for data when searching for the data in the webpage caches no matter whether the terminals currently view the multimedia information through the browser application or view the multimedia information through the client application.

In addition, when a user browses a webpage, if the user does not log in the webpage, the user may only acquire a limited number of resources from the webpage, and if the user logs in to the webpage, the user may acquire richer resources from the webpage. Therefore, under a normal condition, the users may log in webpages through social application accounts, then the social application accounts may be stored in the webpage caches, and the terminals may search the webpages of the browser application for the specified accounts of the social application according to the domain names of the specified social applications.

Moreover, the address information of the terminals may be IP addresses and the like of the terminals, the mobile terminal identifiers of the terminals are configured to uniquely identify the terminals, and the mobile terminal identifiers may be serial numbers and the like of the terminals. Address information of a mobile terminal changes along with change of a network of the terminal, address information of a fixed terminal may usually not change because a network of the fixed terminal may usually not change, and further for the mobile terminal, it is relatively more accurate to determine a mobile terminal identifier of the terminal as characteristic information of the terminal.

Step 403: the characteristic information of the promotion information is sent to a monitoring server.

When the multiple terminals determine the characteristic information of the promotion information by the steps, the characteristic information of the promotion information may be sent to the monitoring server to enable the monitoring server to determine the effectiveness of placing the promotion information according to the following steps.

Step 404: the monitoring server receives the characteristic information sent by the multiple terminals to obtain multiple pieces of characteristic information.

Step 405: the monitoring server makes statistics on a total number of exposures of and a total number of clicks on the promotion information on the basis of the multiple pieces of characteristic information.

When the promotion information is displayed once on each terminal, each terminal may send characteristic information to the monitoring server once by Step 401 to Step 403, that is, the monitoring server determines that the promotion information is exposed once every time when receiving a piece of characteristic information, so that the total number of exposures of the promotion information may be increased to obtain a total number of exposures of the promotion information at current time on the basis of the number of the multiple pieces of characteristic information. For example, the total number of exposures of the promotion information is 300, and when three pieces of characteristic information are received, the total number of exposures of the promotion information is increased by 3 to obtain the total number of exposures 303 of the promotion information at the current time.

In addition, in the display process of the promotion information, the user may execute clicking operation on the promotion information at least once, thereby viewing detailed information of the promotion information, thus the characteristic information may further include a number of clicking operations by the user, and then the monitoring server may make statistics on the total number of clicks on the promotion information on the basis of the number of clicking operations included in each piece of characteristic information. For example, the total number of clicks on the promotion information is 400, the total number of clicking operations included in the multiple pieces of received characteristic information is 15, and then the total number of clicks 400 on the promotion information is increased by 15 to obtain the total number of clicks 415 on the promotion information at the current time.

Step 406: the monitoring server determines user attributes corresponding to the multiple terminals to obtain multiple user attributes on the basis of the multiple pieces of characteristic information.

Specifically, for each piece of characteristic information among the multiple pieces of characteristic information, the monitoring server determines a target specified account of the social application on the basis of the characteristic information, acquires a corresponding user attribute from stored correspondences between specified accounts of the social application and user attributes on the basis of the target specified account of the social application, and determines the acquired user attribute as the user attribute corresponding to the corresponding terminal.

It is important to note that the user attributes corresponding to each terminal are group types of the users of the terminals, and user information may be configured to identify information such as preference information and user behaviour of the users. Therefore, in the embodiment of the disclosure, user information of each specified account of the social application may be acquired in advance, the acquired user information is classified to obtain the user attributes of each specified account of the social application, and the correspondences between specified accounts of the social application and user attributes are further stored. For example, the stored correspondences between specified accounts of the social application and user attributes may be shown in Table 1 as follows.

TABLE 1

| User attribute | Specified account of social application |
|---|---|
| Mother and baby group | 1354526 6253523 |

TABLE 1-continued

| User attribute | Specified account of social application |
|---|---|
| Automobile group | 1345525 |
| Tourism group | 4512445 |
| | 5121542 |
| ... | ... |

From descriptions in Step 402, the characteristic information of the promotion information may be the specified accounts of the social application, the address information or the mobile terminal identifiers, so that the target specified account of the social application may be determined in four manners, specifically as follows.

First manner: when the characteristic information is a specified account of the social application, the specified account of the social application is determined as the target specified account of the social application.

In the embodiment of the disclosure, the monitoring server directly acquires the user attribute corresponding to the corresponding terminal from the stored correspondences between specified accounts of the social application and user attributes on the basis of the target specified account of the social application, so that the specified account of the social application may be directly determined as the target specified account of the social application when the characteristic information is the specified account of the social application.

Second manner: when the characteristic information is address information of the corresponding terminal, at least one specified account of the social application and a number of times that the at least one specified account of the social application has been logged on are acquired on the basis of the address information from stored correspondences among address information, specified accounts of the social application and login times; a specified account of the social application of which the login times is greatest is selected from the at least one specified account of the social application; and the selected specified account of the social application is determined as the target specified account of the social application.

For the second manner, when the characteristic information is the address information of the corresponding terminal, the type of the terminal is determined to be a fixed terminal, so that the address information of the terminal may usually not change; then, when the terminal determines the target specified account of the social application, the terminal may acquire, on the basis of the address information, the at least one specified account of the social application and the number of times that the at least one specified account of the social application has been logged on, from the stored correspondences among the address information, the specified accounts of the social application and login times, and compare the number of times that the at least one specified account of the social application has been logged on to select a specified account of the social application of which the login times is greatest from the at least one specified account of the social application, a specified account of the social application of which the login times is greatest usually being a user of the terminal; and therefore, a specified account of the social application of which the login times is greatest may be directly determined as the target specified account of the social application.

For example, the address information of the terminal is address 1, and the terminal may acquire two specified accounts of the social application, i.e. 1354526 and 6253523 respectively, from the correspondences, shown in Table 2, among address information, specified accounts of the social application and the login times, a login times corresponding to the specified account of the social application 1354526 being 20 and a login times corresponding to the specified account of the social application 6253523 being 2, so that the specified account of the social application 1354526 of which the login times is greatest is selected, and the specified account of the social application 1354526 is determined as a target specified account of the social application.

TABLE 2

| Address information | Specified account of the social application | Login times |
|---|---|---|
| Address 1 | 1354526 | 20 |
| Address 1 | 6253523 | 2 |
| Address 2 | 1220533 | 54 |
| ... | ... | ... |

It is important to note that: when a specified account of the social application is logged on in the terminal for the first time, the monitoring server may store a correspondence among address information of the terminal, the specified account of the social application and a number of times that the specified account of the social application has been logged on, and when a specified account of the social application is logged in the terminal later, the monitoring server may acquire, according to the address information of the terminal, a specified account of the social application from the stored correspondence among the address information, the specified account of the social application and the login times, and compare the acquired specified account of the social application with the specified account of the social application which is currently logged on, and when the two are the same, the monitoring server may update, according to the address information and the specified account of the social application, the number of times that the specified account of the social application has been logged on in the correspondence among the address information, the specified account of the social application and the login times. If the two are different, a new record may be stored in the correspondence, that is, the specified account of the social application may be logged on in different terminals.

Specifically, when the monitoring server updates, according to the address information and the specified account of the social application, the login times in the correspondence among the address information, the specified account of the social application and the login times, the monitoring server may acquire, according to the address information and the specified account of the social application, the corresponding login times from the correspondence among the address information, the specified account of the social application and the login times, and increase the acquired login times by current login times. For example, the monitoring server acquires the corresponding login times of 2 from the correspondence among the address information, the specified account of the social application and the login times according to the address information and the specified account of the social application, and if the current login times is 1, the monitoring server may increase the acquired login time of 2 by the current login times of 1, so as to update the corresponding login times, in the correspondence among the address information, the specified account of the social application and the login times, to be 3. For example, when the specified account of the social application 1354526 is logged on in the terminal, the monitoring server may store the correspondence, shown in Table 2, among the address information, the specified account of the social application and the login times, and when the specified account of the social application 1466252 is logged on in the terminal, the monitoring server may acquires the corresponding specified account of the social application 1354526 from Table 2 according to the address information of the terminal and compare the acquired specified account of the social application 1354526 with the specified account of the social application 1466252 which is currently logged on, and the two are determined to be different, then the monitoring server may store a correspondence among address 1, the specified account of the social application 1466252 and a login times of 1, and at this moment, the correspondence, shown in Table 2, among the address information, the specified account of the social application and the login times may be shown in Table 3.

TABLE 3

| Address information | Specified account of the social application | Login times |
|---|---|---|
| Address 1 | 1354526 | 20 |
| Address 1 | 6253523 | 2 |
| Address 1 | 1466252 | 1 |
| Address 2 | 1220533 | 54 |
| ... | ... | ... |

Third manner: when the characteristic information is a mobile terminal identifier of the corresponding terminal, at least one specified account of the social application and a timestamp of the at least one specified account of the social application are acquired from stored correspondences among mobile terminal identifiers, specified accounts of the social application and timestamps on the basis of the mobile terminal identifier; a specified account of the social application of which the timestamp is closest to current time is selected from the at least one specified account of the social application; and the selected specified account of the social application is determined as the target specified account of the social application.

For the third manner, when the characteristic information is the mobile terminal identifier of the terminal, the terminal is determined to be a mobile terminal, and the mobile terminal identifier of the mobile terminal is unchangeable and unique, so that when the terminal determines the target specified account of the social application, the terminal may acquire the at least one specified account of the social application and the timestamp of the at least one specified account of the social application from the stored correspondences among mobile terminal identifiers, specified accounts of the social application and timestamps on the basis of the mobile terminal identifier; and a specified account of the social application logged on in a mobile terminal is usually a specified account of the social application of an owner of the mobile terminal, so that a specified account of the social application of which the timestamp is closest to the current time is selected from the at least one specified account of the social application, and the selected specified account of the social application is determined as the target specified account of the social application.

It is important to note that: in the embodiment of the disclosure, every time when a specified account of the social application is logged on in the terminal, the monitoring server may store a correspondence among the mobile terminal identifier, the specified account of the social application and a timestamp, thereby determining the target specified account of the social application by the abovementioned method.

Optionally, in the embodiment of the disclosure, when a specified account of the social application is logged on in the terminal for the first time, the monitoring server may store a correspondence between a mobile terminal identifier and a specified account of the social application, and when another specified account of the social application is logged on in the terminal later, the specified account of the social application in the stored correspondence between the mobile terminal identifier and the specified account of the social application may be replaced by said another specified account of the social application according to the mobile terminal identifier of the terminal. After then, when determining the target specified account of the social application, the monitoring server may directly acquire said another specified account of the social application from the stored correspondence between the mobile terminal identifier and the specified account of the social application according to the mobile terminal identifier, and determine the acquired specified account of the social application as the target specified account of the social application. For example, the mobile terminal identifier of the terminal is identifier 1, the monitoring server may store correspondences, shown in Table 4, between mobile terminal identifiers and the specified accounts of the social application when the specified account of the social application 1354526 is logged on in the terminal for the first time, and when a specified account of the social application 2552368 is logged on in the terminal later, the specified account of the social application 1354526 in the stored correspondence between the mobile terminal identifier and the specified account of the social application may be replaced by 2552368 to obtain the correspondences, shown in Table 5, between mobile terminal identifiers and specified accounts of the social application according to the mobile terminal identifier of the terminal.

TABLE 4

| Mobile terminal identifier | Specified account of the social application |
|---|---|
| Identifier 1 | 1354526 |
| Identifier 2 | 1265425 |
| ... | ... |

TABLE 5

| Mobile terminal identifier | Specified account of the social application |
|---|---|
| Identifier 1 | 2552368 |
| Identifier 2 | 1265425 |
| ... | ... |

Fourth manner: when the characteristic information is a mobile terminal identifier of the corresponding terminal, at least one specified account of the social application and a number of times that the at least one specified account of the social application has been logged on are acquired on the basis of the mobile terminal identifier from stored correspondences among mobile terminal identifiers, specified accounts of the social application and login times; a specified account of the social application of which the login times is greatest is selected from the at least one specified account of the social application; and the selected specified account of the social application is determined as the target specified account of the social application.

For the fourth manner, when a specified account of the social application is logged on in the terminal at first, the monitoring server may store a correspondence among a mobile terminal identifier of a terminal, a specified account of the social application and a login times, and when a specified account of the social application is logged on in the terminal later, the monitoring server may acquire the corresponding specified account of the social application from the stored correspondence among the mobile terminal identifier, the specified account of the social application and the login times and compare the acquired specified account of the social application with the specified account of the social application which is currently logged on, and if the two are the same, the monitoring server may update the login times in the correspondence among the mobile terminal identifier, the specified account of the social application and the login times according to the mobile terminal identifier and the specified account of the social application. If the two are different, a new record may be stored in the correspondence among the mobile terminal identifier, the specified account of the social application and the login times, that is, the specified account of the social application may be logged on in different terminals.

Specifically, when the monitoring server updates the login times in the correspondence among the mobile terminal identifier, the specified account of the social application and the login times according to the mobile terminal identifier and the specified account of the social application, the monitoring server may acquire the corresponding login times from the correspondence among the mobile terminal identifier, the specified account of the social application and the login times according to the mobile terminal identifier and the specified account of the social application, and increase the acquired login times by a current login times. For example, the monitoring server acquires the corresponding login times of 4 from the correspondence among the mobile terminal identifier, the specified account of the social application and the login times according to the mobile terminal identifier and the specified account of the social application, and if the current login times is 1, the monitoring server may increase the acquired login times of 4 by the current login times of 1 to update the corresponding login times, in the correspondence among the mobile terminal identifier, the specified account of the social application and the login times, to be 5.

Step 407: the monitoring server makes statistics on a number of hit exposures of the promotion information on the basis of the multiple user attributes and a target user attribute of the promotion information.

The target user attribute is an attribute of audience users of the promotion information, and the target user attribute may be set before the monitoring server makes the statistics on the number of hit exposures of the promotion information on the basis of the multiple user attributes and the target user attribute of the promotion information, specifically as follows: when the monitoring server receives an attribute setting instruction, a user attribute list is displayed; an attribute selection instruction is selected, the attribute selection instruction carrying a user attribute selected from the user attribute list by an information promoter; and the selected user attribute is determined as the target user attribute. For example, when the monitoring server receives the attribute setting instruction, a user attribute list shown in Table 6 may be displayed, and when the attribute selection instruction is received, user attributes automobile group and tourism group in the attribute selection instruction are determined as target user attributes.

TABLE 6

| User attribute list |
| --- |
| Mother and baby group |
| Automobile group |
| Tourism group |
| . . . |

Herein, the attribute setting instruction may be submitted by the information promoter through second specified operation, and the second specified operation may be swipe operation, voice operation, setting button clicking operation and the like, which is not specifically limited in the embodiment of the disclosure.

Step 408: the monitoring server determines effectiveness of placing the promotion information on the basis of the number of hit exposures of the promotion information, the total number of exposures of the promotion information and the total number of clicks on the promotion information.

Specifically, the number of hit exposures of the promotion information is divided by the total number of exposures of the promotion information to obtain a target user coverage rate of the promotion information, the target user coverage rate being a proportion of target users viewing the promotion information in all users viewing the promotion information; the total number of clicks on the promotion information is divided by the total number of exposures of the promotion information to obtain a click rate of the promotion information; a placing effectiveness index of the promotion information is calculated on the basis of the target user coverage rate of the promotion information and the click rate of the promotion information; and the effectiveness of placing the promotion information is determined on the basis of the placing effectiveness index of the promotion information.

The operation that the placing effectiveness index of the promotion information is calculated on the basis of the target user coverage rate of the promotion information and the click rate of the promotion information may be implemented as follows: the placing effectiveness index of the promotion information is calculated on the basis of the target user coverage rate of the promotion information and the click rate of the promotion information according to the following formula:

$$Y = a \times L + (1-a) \times D.$$

In the formula, Y is the placing effectiveness index of the promotion information, L is the target user coverage rate of the promotion information, a is a weight of the target user coverage rate, and D is the click rate of the promotion information.

In the embodiment of the disclosure, in an initial placing stage of the promotion information, accumulation of target users is more important than the click rate of the promotion information, so that the weight of the target user coverage rate may be increased more, and along with passage of placing time of the promotion information, the weight of the target user coverage rate should be gradually decreased. For example, the click rate of the promotion information may reflect the effectiveness of placing the promotion information more in a later placing stage of the promotion information, so that the weight of the target user coverage rate may be decreased. That is, the weight of the target user coverage rate may be regulated along with increase of a placing time length of the promotion information, and many regulation methods may specifically be adopted, which is not specifically limited in the embodiment of the disclosure. For example, multiple placing time length ranges may be divided, and corresponding weights of the target user coverage rate may be set for each placing time length range. For example, the placing time length is divided into three ranges of 0-15 days, 16-90 days and more than 90 days, the weight, corresponding to 0-15 days, of the target user coverage rate is 0.8, the weight, corresponding to 16-90 days, of the target user coverage rate is 0.6, the weight, corresponding to more than 90 days, of the target user coverage rate is 0.3, and they may be stored in correspondences, shown in Table 7, between placing time length and weights.

TABLE 7

| Placing time length | Weight |
|---|---|
| 0-15 days | 0.8 |
| 16-90 days | 0.6 |
| More than 90 days | 0.3 |

When the effectiveness index of the promotion information is calculated on the basis of the target user coverage rate and the click rate of the promotion information, calculation dimensions are increased, and calculation accuracy of the effectiveness index is further improved. In addition, along with passage of the placing time of the promotion information, the target user coverage rate is regulated to further make the calculated effectiveness index consistent with a practical condition more and improve the calculation accuracy of the effectiveness index.

Herein, there are more methods for determining the effectiveness of placing the promotion information on the basis of the placing effectiveness index of the promotion information, and for example, when the placing effectiveness index is more than or equal to a specified threshold value, it is determined that the effectiveness of the promotion information is relatively higher, otherwise it is determined that the effectiveness of the promotion information is relatively lower. Or, the placing effectiveness index of the promotion information may also be processed to further determine the effectiveness of the promotion information. The method is not specifically limited in the embodiment of the disclosure.

In the embodiment of the disclosure, the terminals may determine the characteristic information of the promotion information in the display process of the promotion information, the characteristic information including specified accounts of the social application or the terminal information, and then the monitoring server may determine the user attributes corresponding to the terminals according to the characteristic information sent by the terminals, determine whether users viewing the promotion information are target users or not on the basis of the user attributes of the terminals and the target user attribute, and further make the statistics on the number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

Figure 5:
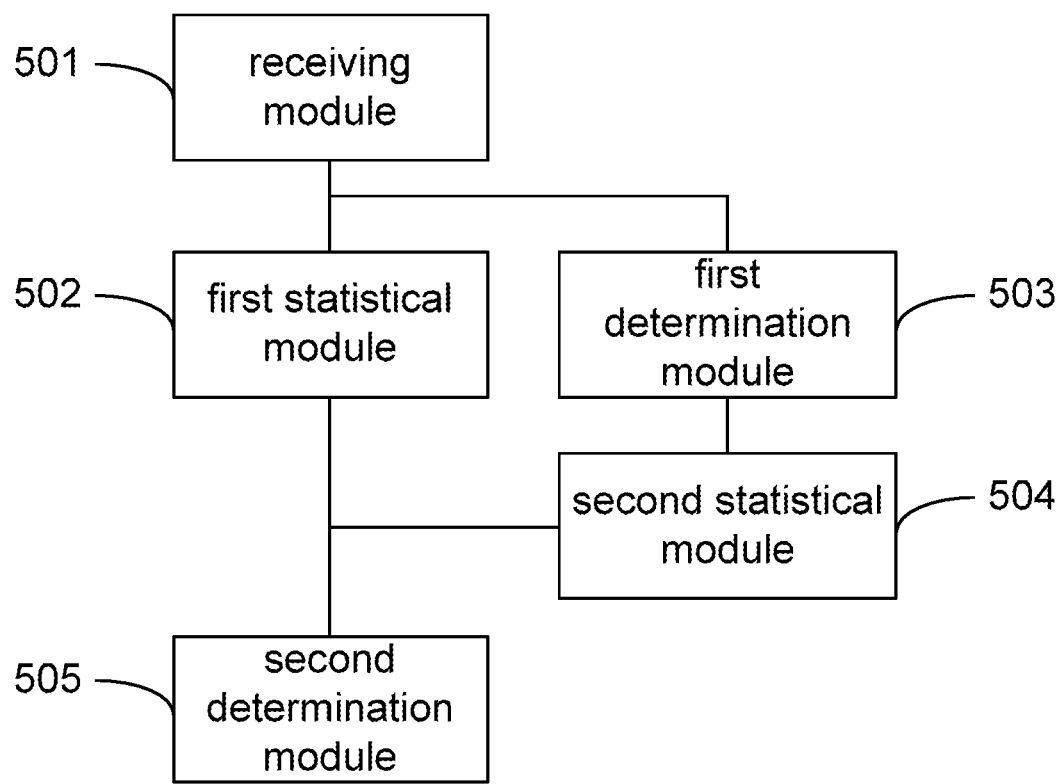
FIG. 5 is a structure diagram of a monitoring server according to an embodiment of the disclosure.

FIG. 5 is a monitoring server according to an embodiment of the disclosure, and referring to FIG. 5, the monitoring server includes:

a receiving module 501, configured to receive characteristic information sent by multiple terminals to obtain multiple pieces of characteristic information, the multiple pieces of characteristic information being obtained by monitoring promotion information by the multiple terminals respectively and the multiple pieces of characteristic information including specified accounts of the social application or terminal information;

a first statistical module 502, configured to make statistics on a total number of exposures of and a total number of clicks on the promotion information on the basis of the multiple pieces of characteristic information;

a first determination module 503, configured to determine user attributes corresponding to the multiple terminals to obtain multiple user attributes on the basis of the multiple pieces of characteristic information;

a second statistical module 504, configured to make statistics on a number of hit exposures of the promotion information on the basis of the multiple user attributes and a target user attribute of the promotion information; and a second determination module 505, configured to determine effectiveness of placing the promotion information on the basis of the number of hit exposures of the promotion information, the total number of exposures of the promotion information and the total number of clicks on the promotion information.

Optionally, the first determination module 503 includes:

a first determination unit, configured to, for each piece of characteristic information among the multiple pieces of characteristic information, determine a target specified account of the social application on the basis of the characteristic information; and an acquisition unit, configured to acquire the user attributes corresponding to the terminals from stored correspondences between specified accounts of the social application and user attributes on the basis of the target specified accounts of the social application.

Optionally, the first determination unit includes:

a first determination subunit, configured to, when the characteristic information is a specified account of the social application, determine the specified account of the social application as the target specified account of the social application.

Optionally, the first determination unit includes:

a first acquisition subunit, configured to, when the characteristic information is address information of the corresponding terminal, acquire, on the basis of the address information of the terminal, at least one specified account of the social application and a number of times that the at least one specified account of the social application has been logged on, from stored correspondences among address information, specified accounts of the social application and login times;

a first selection subunit, configured to select a specified account of the social application of which the login times is greatest from the at least one specified account of the social application; and a second determination subunit, configured to determine the selected specified account of the social application as the target specified account of the social application.

Optionally, the first determination unit includes:

a second acquisition subunit, configured to, when the characteristic information is a mobile terminal identifier of the corresponding terminal, acquire, on the basis of the mobile terminal identifier of the terminal, at least one specified account of the social application and a timestamp of the at least one specified account of the social application from stored correspondences among mobile terminal identifiers, specified accounts of the social application and timestamps;

a second selection subunit, configured to select a specified account of the social application of which the timestamp is closest to current time from the at least one specified account of the social application; and a third determination subunit, configured to determine the selected specified account of the social application as the target specified account of the social application.

Optionally, the first determination unit includes:

a third acquisition subunit, configured to, when the characteristic information is a mobile terminal identifier of the corresponding terminal, acquire, on the basis of the mobile terminal identifier of the terminal, at least one specified account of the social application and a number of times that the at least one specified account of the social application has been logged on, from stored correspondences among mobile terminal identifiers, specified accounts of the social application and login times;

a third selection subunit, configured to select a specified account of the social application of which the login times is greatest from the at least one specified account of the social application; and a fourth determination subunit, configured to determine the selected specified account of the social application as the target specified account of the social application.

Optionally, the second determination module includes:

a first calculation unit, configured to divide the number of hit exposures of the promotion information by the total number of exposures of the promotion information to obtain a target user coverage rate of the promotion information;

a second calculation unit, configured to divide the total number of clicks on the promotion information by the total number of exposures of the promotion information to obtain a click rate of the promotion information;

a third calculation unit, configured to calculate a placing effectiveness index of the promotion information on the basis of the target user coverage rate of the promotion information and the click rate of the promotion information; and a second determination unit, configured to determine the effectiveness of placing the promotion information on the basis of the placing effectiveness index of the promotion information.

Optionally, the monitoring server further includes:

a display module, configured to, when an attribute setting instruction is received, display a user attribute list;

a receiving module, configured to receive an attribute selection instruction, the attribute selection instruction carrying a user attribute selected from the user attribute list by an information promoter; and a third determination module, configured to determine the selected user attribute as the target user attribute.

In the embodiment of the disclosure, the terminals may determine the characteristic information of the promotion information in the display process of the promotion information, the characteristic information including specified accounts of the social application or the terminal information, and then the monitoring server may determine the user attributes corresponding to the terminals according to the characteristic information sent by the terminals, determine whether users viewing the promotion information are target users or not on the basis of the user attributes of the terminals and the target user attribute, and further make the statistics on the number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

It is important to note that: when determining the effectiveness of placing the promotion information, the monitoring server provided by the embodiment is only described with division of each of the abovementioned functional modules as an example, and during practical application, the abovementioned functions may be allocated to different functional modules for realization according to a requirement, that is, an internal structure of the monitoring server is divided into different functional modules to realize all or part of the abovementioned functions. In addition, the monitoring server provided by the embodiment adopts the same concept with the method for determining effectiveness of placing promotion information embodiment, and details about its specific implementation process refer to the method embodiment, and will not be elaborated herein.

Figure 6:
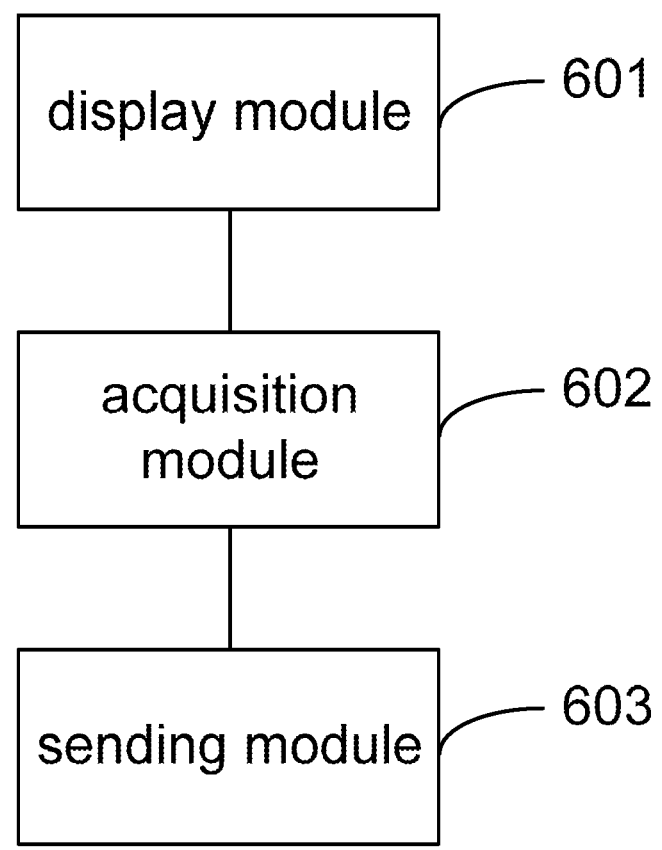
FIG. 6 is a structure diagram of a terminal according to an embodiment of the disclosure.

FIG. 6 is a terminal according to an embodiment of the disclosure, and referring to FIG. 6, the terminal includes:

a display module 601, configured to, when an instruction for viewing multimedia information is received, display promotion information placed in the multimedia information;

an acquisition module 602, configured to acquire characteristic information of the promotion information in a display process of the promotion information, the characteristic information including a specified account of the social application or terminal information; and a sending module 603, configured to send the characteristic information of the promotion information to a monitoring server to enable the monitoring server to determine effectiveness of placing the promotion information on the basis of the characteristic information of the promotion information.

Optionally, the acquisition module 602 includes:

a judgment unit, configured to judge whether a specified account of the social application is currently logged on in a terminal or not in the display process of the promotion information; and a first determination unit, configured to, when the specified account of the social application is currently logged on in the terminal, determine the specified account of the social application currently logged on in the terminal as the characteristic information of the promotion information.

Optionally, the acquisition module 602 further includes:

a searching unit, configured to, when the specified account of the social application does not currently log in the terminal, search a webpage cache for the corresponding specified account of the social application according to a domain name of the social application;

a second determination unit, configured to, if the corresponding specified account of the social application is found, determine the found specified account of the social application as the characteristic information of the promotion information;

a third determination unit, configured to, if the corresponding specified account of the social application is not found, determine the type of the terminal;

a fourth determination unit, configured to, when the terminal is a fixed terminal, determine address information of the terminal as the characteristic information of the promotion information; and a fifth determination unit, configured to, when the terminal is a mobile terminal, determine a mobile terminal identifier of the terminal as the characteristic information of the promotion information.

In the embodiment of the disclosure, the terminal may determine the characteristic information of the promotion information in the display process of the promotion information, the characteristic information including the specified account of the social application or the terminal information, and then the monitoring server may determine a user attribute corresponding to the terminal according to the characteristic information sent by the terminal, determine whether a user viewing the promotion information is a target user or not on the basis of the user attribute of the terminal and a target user attribute, and further make statistics on a number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

It is important to note that: when determining the effectiveness of placing the promotion information, the terminal provided by the embodiment is only described with division of each of the abovementioned functional modules as an example, and during practical application, the abovementioned functions may be allocated to different functional modules for realization according to a requirement, that is, an internal structure of the terminal is divided into different functional modules to realize all or part of the abovementioned functions. In addition, the terminal provided by the embodiment adopts the same concept with the embodiments of the method for determining effectiveness of placing promotion information, and details about its specific implementation process refer to the method embodiment, and will not be elaborated herein.

Figure 7:
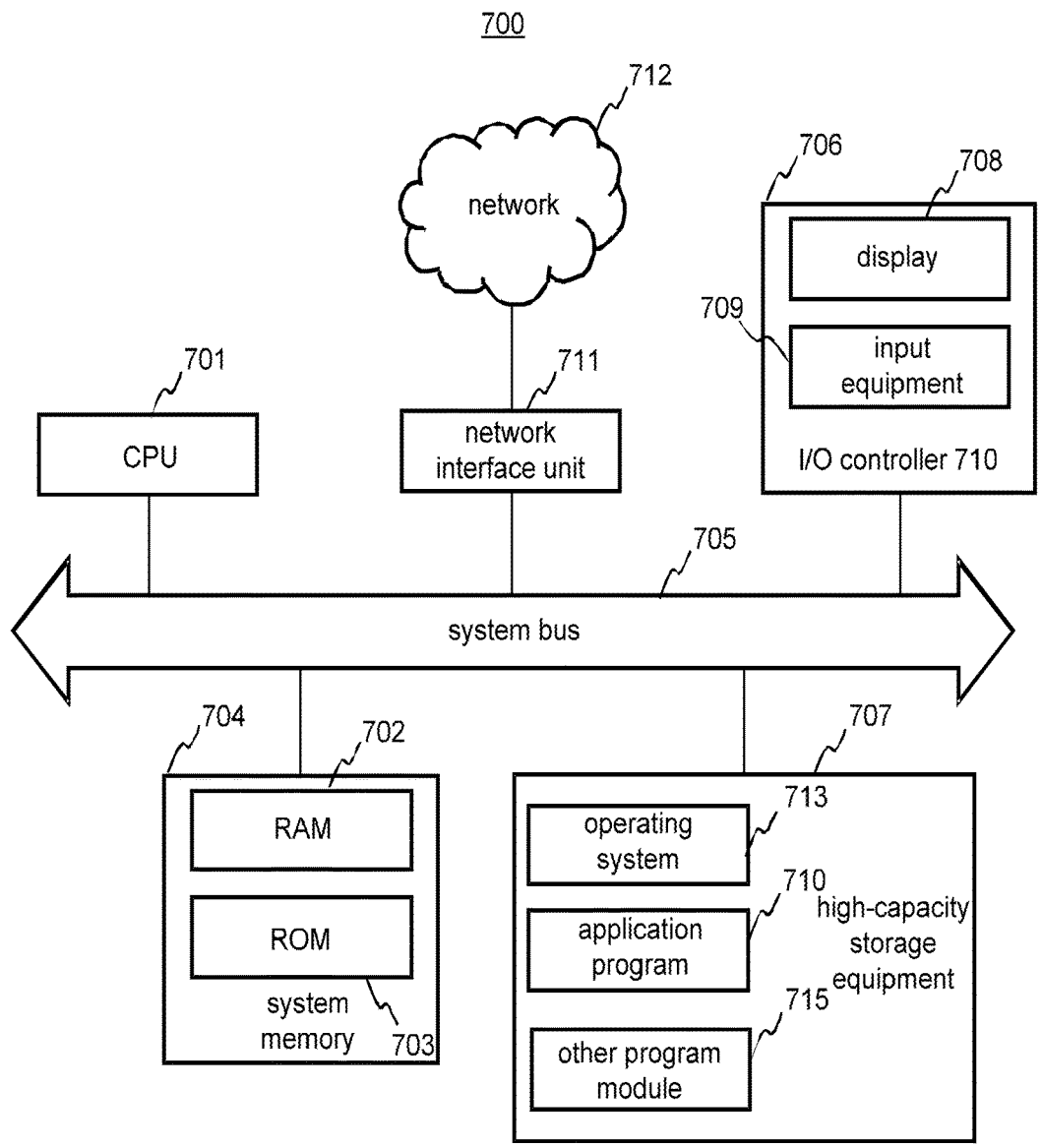
FIG. 7 is a structure diagram of another monitoring server according to an embodiment of the disclosure.

FIG. 7 is a structure diagram of a monitoring server according to an embodiment of the disclosure. The monitoring server 700 includes a Central Processing Unit (CPU) 701, a system memory 704 including a Random Access Memory (RAM) 702 and a Read-Only Memory (ROM) 703, and a system bus 705 which connects the system memory 704 with the CPU 701. The monitoring server 700 further includes a basic Input/Output (I/O) system 706 which helps each device in a computer to transmit information, and high-capacity storage equipment 707 configured to store an operating system 713, an application program 710 and another program module 715.

The basic I/O system 706 includes a display 708 configured to display the information and input equipment 709, such as a mouse and a keyboard, configured for a user to input the information, herein the display 708 and the input equipment 709 are connected to the CPU 701 through an I/O controller 710 connected to the system bus 705. The basic I/O system 706 may further include the I/O controller 710 configured to receive and process input from multiple pieces of other equipment such as a keyboard, a mouse and an electronic stylus. Similarly, the I/O controller 710 further provides output to a display screen, a printer or output equipment of another type.

The high-capacity storage equipment 707 is connected to the CPU 701 through a high-capacity storage controller (not shown) connected to the system bus 705. The high-capacity storage equipment 707 and its associated computer-readable medium provide nonvolatile storage for the monitoring server 700. That is, the high-capacity storage equipment 707 may include the computer-readable medium (not shown) such as a hard disk or a Compact Disc Read-Only Memory (CD-ROM) drive.

In general, the computer-readable medium may include a computer storage medium and a communication medium. The computer storage medium includes volatile, nonvolatile, movable and unmovable media configured to store information such as computer-readable instructions, data structures, program modules or other data and implemented by any method or technology. The computer storage medium includes a RAM, a ROM, an Erasable Programmable Read Only Memory (EPROM), an Electrically Erasable Programmable Read Only Memory (EEPROM), a flash memory or other solid state storage equipment, a CD-ROM, a Digital Video Disk (DVD) or other optical storage equipment, a tape cassette, a storage tape, a disk memory or other magnetic storage equipment. Of course, those skilled in the art should know that the computer storage medium is not limited to those mentioned above. The system memory 704 and the high-capacity storage equipment 707 may be collectively known as memories.

According to each embodiment of the disclosure, the monitoring server 300 may further be connected to a remote computer on a network through the network such as the Internet for running. That is, the monitoring server 700 may be connected to the network 712 through a network interface unit 711 connected to the system bus 705, or, may also be connected to a network of another type or a remote computer system (not shown) through the network interface unit 711.

The memory also includes one or more than one program, the one or more than one program is stored in the memory, and the one or more than program includes instructions configured to execute the promotion information effectiveness determination method provided by the embodiment of the disclosure.

Characteristic information sent by multiple terminals is received to obtain multiple pieces of characteristic information, the multiple pieces of characteristic information being obtained by monitoring promotion information by the multiple terminals respectively and the multiple pieces of characteristic information including specified accounts of the social application or terminal information.

Statistics on a total number of exposures of and a total number of clicks on the promotion information is made on the basis of the multiple pieces of characteristic information.

User attributes corresponding to the multiple terminals are determined to obtain multiple user attributes on the basis of the multiple pieces of characteristic information.

Statistics on a number of hit exposures of the promotion information is made on the basis of the multiple user attributes and a target user attribute of the promotion information.

Effectiveness of placing the promotion information is determined on the basis of the number of hit exposures of the promotion information, the total number of exposures of the promotion information and the total number of clicks on the promotion information.

Optionally, the step that the user attributes corresponding to the multiple terminals are determined to obtain the multiple user attributes on the basis of the multiple pieces of characteristic information includes that:

for each piece of characteristic information among the multiple pieces of characteristic information, a target specified account of the social application is determined on the basis of the characteristic information; and the user attributes corresponding to the terminals are acquired from stored correspondences between specified accounts of the social application and user attributes on the basis of the target specified accounts of the social application.

Optionally, the step that the target specified account of the social application is determined on the basis of the characteristic information includes that:

when the characteristic information is a specified account of the social application, the specified account of the social application is determined as the target specified account of the social application.

Optionally, the step that the target specified account of the social application is determined on the basis of the characteristic information includes that:

when the characteristic information is address information of the corresponding terminal, at least one specified account of the social application and a number of times that the at least one specified account of the social application has been logged on are acquired on the basis of the address information of the terminal from stored correspondences among address information, specified accounts of the social application and login times;

a specified account of the social application of which the login times is greatest is selected from the at least one specified account of the social application; and the selected specified account of the social application is determined as the target specified account of the social application.

Optionally, the step that the target specified account of the social application is determined on the basis of the characteristic information includes that:

when the characteristic information is a mobile terminal identifier of the corresponding terminal, at least one specified account of the social application and a timestamp of the at least one specified account of the social application are acquired, on the basis of the mobile terminal identifier of the terminal, from stored correspondences among mobile terminal identifiers, specified accounts of the social application and timestamps;

a specified account of the social application of which the timestamp is closest to current time is selected from the at least one specified account of the social application; and the selected specified account of the social application is determined as the target specified account of the social application.

Optionally, the step that the target specified account of the social application is determined on the basis of the characteristic information includes that:

when the characteristic information is a mobile terminal identifier of the corresponding terminal, at least one specified account of the social application and a number of times that the at least one specified account of the social application has been logged on are acquired on the basis of the mobile terminal identifier of the terminal from stored correspondences among mobile terminal identifiers, specified accounts of the social application and login times;

a specified account of the social application of which the login times is greatest is selected from the at least one specified account of the social application; and the selected specified account of the social application is determined as the target specified account of the social application.

Optionally, the step that the effectiveness of placing the promotion information is determined on the basis of the number of hit exposures of the promotion information, the total number of exposures of the promotion information and the total number of clicks on the promotion information includes that:

the number of hit exposures of the promotion information is divided by the total number of exposures of the promotion information to obtain a target user coverage rate of the promotion information;

the total number of clicks on the promotion information is divided by the total number of exposures of the promotion information to obtain a click rate of the promotion information;

a placing effectiveness index of the promotion information is calculated on the basis of the target user coverage rate of the promotion information and the click rate of the promotion information; and the effectiveness of placing the promotion information is determined on the basis of the placing effectiveness index of the promotion information.

Optionally, before the step that the statistics on the number of hit exposures of the promotion information is made on the basis of the multiple user attributes and the target user attribute of the promotion information, the method further includes that:

when an attribute setting instruction is received, a user attribute list is displayed;

an attribute selection instruction is received, the attribute selection instruction carrying a user attribute selected from the user attribute list by an information promoter; and the selected user attribute is determined as the target user attribute.

In the embodiment of the disclosure, the terminals may determine the characteristic information of the promotion information in the display process of the promotion information, the characteristic information including specified accounts of the social application or the terminal information, and then the monitoring server may determine the user attributes corresponding to the terminals according to the characteristic information sent by the terminals, determine whether users viewing the promotion information are target users or not on the basis of the user attributes of the terminals and the target user attribute, and further make the statistics on the number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

In an exemplary embodiment, there is also provided a non-transitory computer-readable storage medium including instructions, for example, a memory including instructions, and the instructions may be executed by a processor of a monitoring server to implement a method for determining effectiveness of placing promotion information. For example, the non-transitory computer-readable storage medium may be a ROM, a RAM, a CD-ROM, a storage tape, a floppy disk, optical data storage equipment and the like.

Figure 8:
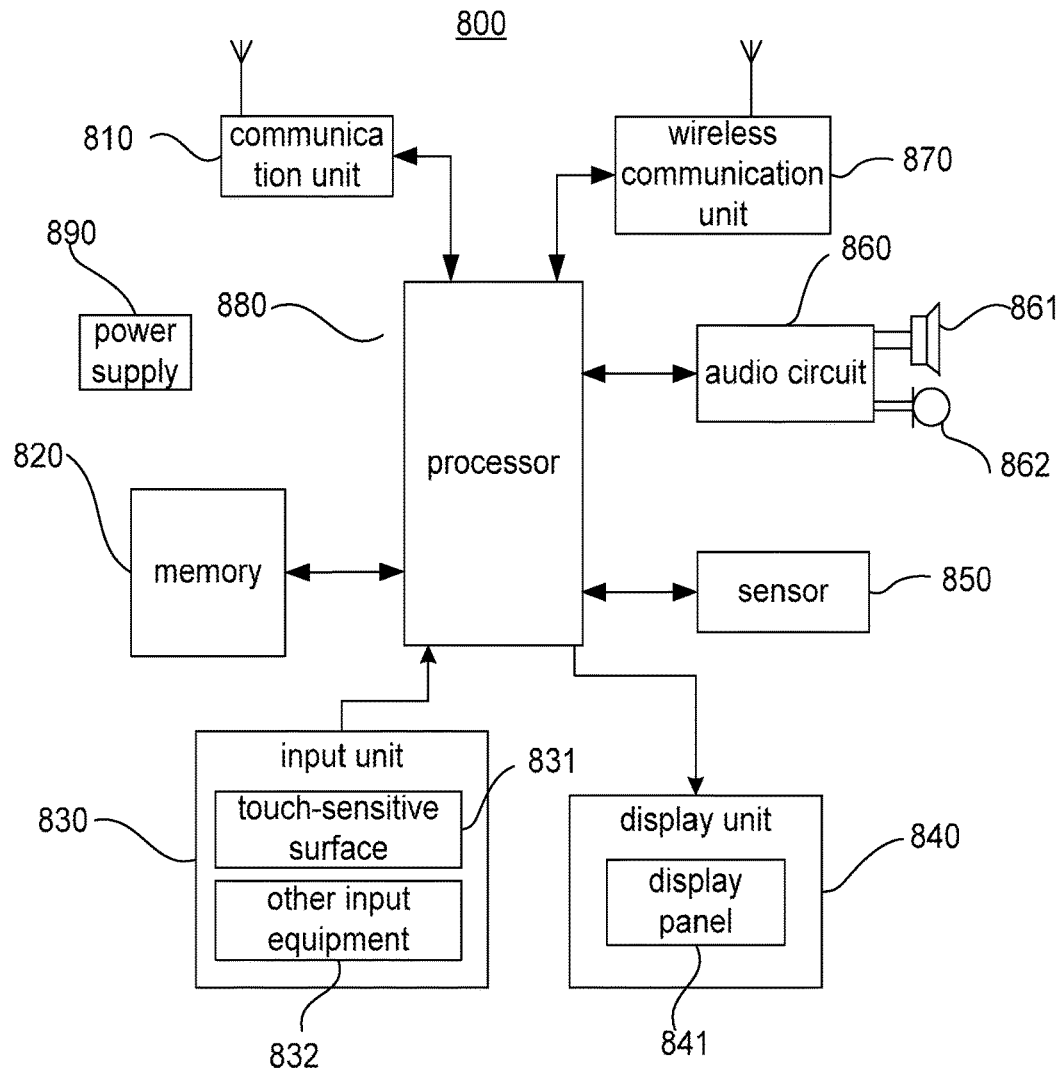
FIG. 8 is a structure diagram of another terminal according to an embodiment of the disclosure.

FIG. 8 is a structure block diagram of a terminal according to an embodiment of the disclosure, and the terminal 800 may include parts such as a communication unit 810, a memory 820 including one or more than one computer-readable storage medium, an input unit 830, a display unit 840, a sensor 850, an audio circuit 860, a Wireless Fidelity (WIFI) module 870, a processor 880 including one or more than one processing core and a power supply 890. Those skilled in the art should know that the terminal structure shown in FIG. 8 is not intended to form limits to the terminal, and may include more or fewer parts than those shown in the figure, or some parts may be combined, or the parts may be arranged in different manners.

Herein, the communication unit 810 may be configured to receive and send a signal in an information transmission and receiving or communication process, and the communication unit 810 may be network communication equipment such as a Radio Frequency (RF) circuit, a router and a modem. Particularly, when being an RF circuit, the communication unit 810 transmits downlink information of a base station to one or more than one processor 880 for processing after receiving it, and also sends involved uplink data to the base station. Usually, the RF circuit serving as the communication unit includes, but not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the communication unit 810 may further communicate with a network and other equipment in a wireless communication manner. Wireless communication may adopt any communication standard or protocol, including, but not limited to, Global System of Mobile Communication (GSM), General Packet Radio Service (GPRS), Code Division Multiple Access (CDMA), Wideband Code Division Multiple Access (WCDMA), Long Term Evolution (LTE), electronic mail, Short Messaging Service (SMS) and the like. The memory 820 may be configured to store software programs and modules. The processor 880 runs the software programs and modules stored in the memory 820, thereby executing various function applications and data processing. The memory 820 may mainly include a program storage area and a data storage area, herein the program storage area may store operating systems, application programs required by at least one function (such as a sound play function and an image play function) and the like; and the data storage area may store data (such as audio data and a telephone book) created according to use of the terminal 800 and the like. In addition, the memory 820 may include a high speed random access memory, and may also include a nonvolatile memory, such as at least one disk memory, a flash memory or another volatile solid state memory. Correspondingly, the memory 820 may further include a memory controller for providing access to the memory 820 for the processor 880 and the input unit 830.

The input unit 830 may be configured to receive input digital or character information and generate keyboard, mouse, operating rod, optical or trackball signal input related to user setting and function control. Preferably, the input unit 830 may include a touch-sensitive surface 831 and other input equipment 832. The touch-sensitive surface 831, also called a touch display screen or a touchpad, may collect touch operation of a user thereon or nearby (such as operation of the user executed on the touch-sensitive surface 831 or nearby the touch-sensitive surface 831 by virtue of any proper object such as a finger and a stylus) and drive a corresponding connecting device according to a preset program. Optionally, the touch-sensitive surface 831 may include two parts, i.e. a touch detection device and a touch controller, herein the touch detection device detects a touch direction of the user, detects a signal generated by the touch operation, and sends the signal to the touch controller; and the touch controller receives touch information from the touch detection device, converts it into a touch coordinate for sending to the processor 880, and may receive and execute a command sent by the processor 880. In addition, the touch-sensitive surface 831 may be implemented by adopting a resistor, a capacitor, infrared rays, surface acoustic waves and the like. Besides the touch-sensitive surface 831, the input unit 830 may further include the other input equipment 832. Preferably, the other input equipment 832 may include, but not limited to, one or more of a physical keyboard, a function key (such as a volume control key and an on/off key), a trackball, a mouse, an operating rod and the like.

The display unit 840 may be configured to display information input by the user or information provided for the user and various graphic user interfaces of the terminal 800, and these graphic user interfaces may be formed by graphics, texts, icons, videos and any combinations thereof. The display unit 840 may include a display panel 841, and the display panel 841 may be optionally configured in form of Liquid Crystal Display (LCD), Organic Light-Emitting Diode (OLED) and the like. Furthermore, the touch-sensitive surface 831 may cover the display panel 841, the touch operation on or nearby the touch-sensitive surface 831 is sent to the processor 880 to determine the type of a touch event after being detected, and then the processor 880 provides corresponding visual output on the display panel 841 according to the touch event. Although the touch-sensitive surface 831 and display panel 841 in FIG. 8 realize input and output functions as two independent parts, the touch-sensitive surface 831 and the display panel 841 may be integrated to realize the input and output functions in some embodiments.

The terminal 800 may further include at least one sensor 850, such as a light sensor, a motion sensor and another sensor. The light sensor may include an ambient light sensor and a proximity sensor, herein the ambient light sensor may regulate luminance of the display panel 841 according to brightness of ambient light, and the proximity sensor may turn off the display panel 841 and/or backlight when the terminal 800 moves to an ear. As a motion sensor, a gravity acceleration sensor may detect a magnitude of acceleration in each direction (usually three axes), may detect a magnitude and direction of gravity under a still condition, and may be configured for a mobile phone state identification application (such as horizontal and vertical screen switching, a related game and magnetometer state calibration), a vibration identification related function (such as a pedometer and knocking) and the like; and the other sensor, such as a gyroscope, an air pressure gauge, a hygrometer, a thermometer and an infrared sensor, which may be configured in the terminal 800 will not be elaborated herein.

The audio circuit 860, a loudspeaker 861 and a microphone 862 may provide an audio interface between the user and the terminal 800. The audio circuit 860 may transmit an electric signal converted from received audio data to the loudspeaker 861, and the loudspeaker 861 converts the electric signal into a sound signal for output; and on the other hand, the microphone 862 converts a collected sound signal into an electric signal, and the audio circuit 860 receives and converts the electric signal into audio data, outputs the audio data to the processor 880 for processing, and sends the audio data to another terminal through the communication unit 810, or outputs the audio data to the memory 820 for further processing. The audio circuit 860 may further include an earplug hole for providing communication between an external earphone and the terminal 800.

The wireless communication unit 870 may be configured on the terminal to implement wireless communication, and the wireless communication unit 870 may be a WIFI module. WIFI belongs to a short-distance wireless transmission technology, the terminal 800 may help the user to send and receive electronic mails, browse web pages, access streaming media and the like through the wireless communication unit 870, and it provides wireless wideband Internet access for the user. Although the wireless communication unit 870 is shown in the figure, it may be understood that it is not a necessary component of the terminal 800 and may completely be eliminated without changing the scope of the nature of the disclosure according to a requirement.

The processor 880, as a control center of the terminal 800, connects each part of the whole mobile phone by virtue of various interfaces and lines, and executes various functions and data processing of the terminal 800 by running or executing the software programs and/or modules stored in the memory 820 and calling the data stored in the memory 820, thereby monitoring the whole terminal. Optionally, the processor 880 may include one or more processing cores; and preferably, the processor 880 may integrate an application processor and a modulation and demodulation processor, herein the application processor mainly processes an operating system, a user interface, an application program and the like, and the modulation and demodulation processor mainly processes wireless communication. It may be understood that the modulation and demodulation processor may also not be integrated into the processor 880.

The terminal 800 further includes the power supply 890 (such as a battery) for supplying power to each part, and preferably, the power supply may be logically connected with the processor 880 through a power management system, thereby realizing functions of charging and discharging management, power consumption management and the like through the power management system. The power supply 890 may further include one or more than one direct current or alternating current power supply, rechargeable system, power failure detection circuit, power converter or inverter, power state indicator and the like.

Although not being shown, the terminal 800 may further include a camera, a Bluetooth module and the like, which will not be elaborated herein.

In the embodiment, the terminal further includes one or more than one program, the one or more than one program is stored in the memory, and is configured to be executed by one or more than one processor, and the one or more than one program includes instructions configured to execute a method for determining effectiveness of placing promotion information provided by the embodiment of the disclosure.

When an instruction for viewing multimedia information is received, promotion information placed in the multimedia information is displayed.

Characteristic information of the promotion information is acquired in a display process of the promotion information, the characteristic information including a specified account of the social application or terminal information.

The characteristic information of the promotion information is sent to a monitoring server to enable the monitoring server to determine effectiveness of placing the promotion information on the basis of the characteristic information of the promotion information.

Optionally, the step that the characteristic information of the promotion information is acquired in the display process of the promotion information includes that:

whether the specified account of the social application is currently logged on in a terminal or not is judged in the display process of the promotion information; and when the specified account of the social application is currently logged on in the terminal, the specified account of the social application currently logged on in the terminal is determined as the characteristic information of the promotion information.

Optionally, after the step that whether the specified account of the social application is currently logged on in the terminal or not is judged, the method further includes that:

when the specified account of the social application does not currently log in the terminal, a webpage cache is searched for the corresponding specified account of the social application according to a domain name of the social application;

if the corresponding specified account of the social application is found, the found specified account of the social application is determined as the characteristic information of the promotion information;

if the corresponding specified account of the social application is not found, the type of the terminal is determined;

when the terminal is a fixed terminal, address information of the terminal is determined as the characteristic information of the promotion information; and when the terminal is a mobile terminal, a mobile terminal identifier of the terminal is determined as the characteristic information of the promotion information.

In the embodiment of the disclosure, the terminal may determine the characteristic information of the promotion information in the display process of the promotion information, the characteristic information including the specified account of the social application or the terminal information, and then the monitoring server may determine a user attribute corresponding to the terminal according to the characteristic information sent by the terminal, determine whether a user viewing the promotion information is a target user or not on the basis of the user attribute of the terminal and a target user attribute, and further make statistics on a number of hit exposures of the promotion information, that is, the number of hit exposures of the promotion information is obtained by making the statistics for audience users of the promotion information, so that the number of hit exposures is more pertinent, and furthermore, accuracy of determining the effectiveness of placing the promotion information on the basis of the number of hit exposures of the promotion information is relatively higher.

In an exemplary embodiment, there is also provided a non-transitory computer-readable storage medium including instructions, for example, a memory including instructions, and the instructions may be executed by a processor of a monitoring server to implement a method for determining effectiveness of placing promotion information. For example, the non-transitory computer-readable storage medium may be a ROM, a RAM, a CD-ROM, a storage tape, a floppy disk, optical data storage equipment and the like.

Those skilled in the art should know that all or part of the steps of the embodiments may be implemented by hardware, and may also be implemented by related hardware instructed by a program, the program may be stored in a computer-readable storage medium, and the abovementioned storage medium may be a ROM, a magnetic disk, a compact disc or the like.

The above is only the preferred embodiment of the disclosure and not intended to limit the disclosure, and any modification, equivalent replacement, improvement and the like made within the spirit and principle of the disclosure shall fall within the scope of protection of the disclosure.

What is claimed is:

1. A method for determining effectiveness of placing promotion information, comprising:

acquiring, by a monitoring server having one or more processing circuits, characteristic information sent by multiple terminals to obtain multiple pieces of characteristic information, the multiple pieces of characteristic information being obtained by monitoring the promotion information by the multiple terminals respectively and the multiple pieces of characteristic information comprising specified accounts of a social application or terminal information, wherein the promotion information is obtained from the multiple terminals when the multiple terminals have stored the promotion information, or from a promotion information server when the multiple terminals have not yet stored the promotion information;

making statistics, by the one or more processing circuits of the monitoring server, on a total number of exposures of and a total number of clicks on the promotion information based on the multiple pieces of characteristic information, wherein making statistics on the total number of exposures of the promotion information comprises: determining, by the one or more processing circuits of the monitoring server, that the promotion information is exposed once every time when a piece of the characteristic information is received from one of the multiple terminals, and increasing, by the one or more processing circuits of the monitoring server, the total number of exposures by one; and each characteristic information includes a number of clicking operations, wherein making statistics on the total number of clicks on the promotion information comprises: summing a previous total number of clicks and a total number of clicking operations included in one or more pieces of received characteristic information;

determining, by the one or more processing circuits of the monitoring server based on the multiple pieces of characteristic information sent by multiple terminals, user attributes corresponding to the multiple terminals to obtain multiple user attributes;

making statistics, by the one or more processing circuits of the monitoring server, on a number of hit exposures of the promotion information based on the multiple user attributes and a target user attribute of the promotion information, the number of hit exposures being a number of times the promotion information is viewed by target users, wherein whether users viewing the promotion information are target users or not are determined based on the user attributes of the multiple terminals and a target user attribute;

determining, by the one or more processing circuits of the monitoring server, the effectiveness of placing the promotion information based on the number of hit exposures of the promotion information, the total number of exposures of the promotion information and the total number of clicks on the promotion information according to a following formula:

$Y = a \times L + (1-a) \times D,$ where Y is the effectiveness of placing the promotion information, L is a target user coverage rate of the promotion information, a is a weight of the target user coverage rate, and D is a click rate of the promotion information, wherein the target user coverage rate of the promotion information is obtained through dividing the number of hit exposures of the promotion information by the total number of exposures of the promotion information, and the click rate of the promotion information is obtained through dividing the total number of clicks on the promotion information by the total number of exposures of the promotion information;

when an instruction for viewing multimedia information is received, displaying, by one or more terminals on a display screen, promotion information placed in the multimedia information;

acquiring, by the one or more terminals, characteristic information of the promotion information in a display process of the promotion information, the characteristic information comprising a specified account of a social application or terminal information, wherein a total number of exposures of and a total number of clicks on the promotion information and user attributes corresponding to the one or more terminals are determined based on the characteristic information, wherein the number of hit exposures of the promotion information is determined based on the user attributes corresponding to the one or more terminals; and sending, by the one or more terminals, the characteristic information of the promotion information to the monitoring server to enable the monitoring server to determine effectiveness of placing the promotion information based on the number of hit exposures of the promotion information and the total number of exposures of and the total number of clicks on the promotion information.

2. The method according to claim 1, wherein determining, based on the multiple pieces of characteristic information, the user attributes corresponding to the multiple terminals to obtain the multiple user attributes comprises:

for each piece of characteristic information among the multiple pieces of characteristic information, determining a target specified account of the social application based on the characteristic information; and acquiring the user attributes corresponding to the multiple terminals from stored correspondences between specified accounts of the social application and user attributes based on the target specified accounts of the social application.

3. The method according to claim 2, wherein determining the target specified account of the social application based on the characteristic information comprises:

when the characteristic information is address information of a corresponding terminal, acquiring, based on the address information, at least one specified account of the social application and a number of times that the at least one specified account of the social application has been logged on, from stored correspondences among address information, specified accounts of the social application and login times;

selecting a specified account of the social application of which the login times is greatest from the at least one specified account of the social application; and determining the selected specified account of the social application as the target specified account of the social application.

4. The method according to claim 2, wherein determining the target specified account of the social application based on the characteristic information comprises:

when the characteristic information is a mobile terminal identifier of a corresponding terminal, acquiring, based on the mobile terminal identifier, at least one specified account of the social application and a timestamp of the at least one specified account of the social application from stored correspondences among mobile terminal identifiers, specified accounts of the social application and timestamps;

selecting a specified account of the social application of which the timestamp is closest to current time from the at least one specified account of the social application; and determining the selected specified account of the social application as the target specified account of the social application.

5. The method according to claim 2, wherein determining the target specified account of the social application based on the characteristic information comprises:

when the characteristic information is a mobile terminal identifier of a corresponding terminal, acquiring, based on the mobile terminal identifier, at least one specified account of the social application and a number of times that the at least one specified account of the social application has been logged on, from stored correspondences among mobile terminal identifiers, specified accounts of the social application and login times;

selecting a specified account of the social application of which the login times is greatest from the at least one specified account of the social application; and determining the selected specified account of the social application as the target specified account of the social application.

6. The method according to claim 2, wherein determining the target specified account of the social application based on the characteristic information comprises:

when the characteristic information is a specified account of the social application, determining the specified account of the social application as the target specified account of the social application.

7. The method according to claim 1, wherein determining the effectiveness of placing the promotion information based on the number of hit exposures of the promotion information, the total number of exposures of the promotion information and the total number of clicks on the promotion information comprises:

dividing the number of hit exposures of the promotion information by the total number of exposures of the promotion information to obtain a target user coverage rate of the promotion information;

dividing the total number of clicks on the promotion information by the total number of exposures of the promotion information to obtain a click rate of the promotion information;

calculating a placing effectiveness index of the promotion information based on the target user coverage rate of the promotion information and the click rate of the promotion information; and determining the effectiveness of placing the promotion information based on the placing effectiveness index of the promotion information.

8. The method according to claim 1, further comprising: before making the statistics on the number of hit exposures of the promotion information based on the multiple user attributes and the target user attribute of the promotion information, when an attribute setting instruction is received, displaying a user attribute list;

receiving an attribute selection instruction, the attribute selection instruction carrying a user attribute selected from the user attribute list by an information promoter; and determining the selected user attribute as the target user attribute.

9. The method according to claim 1, wherein acquiring the characteristic information of the promotion information in the display process of the promotion information comprises:

judging in the display process of the promotion information whether a specified account of the social application is currently logged on in the one or more of the terminals; and when the specified account of the social application is currently logged on in the one or more of the terminals, determining the specified account of the social application currently logged on in the one or more of the terminals as the characteristic information of the promotion information.

10. The method according to claim 9, further comprising: after judging whether the specified account of the social application is currently logged on in the one or more of the terminals, when the specified account of the social application is not currently logged on in the one or more of the terminals, searching a webpage cache for the specified account of the social application according to a domain name of the social application;

if the specified account of the social application is found, determining the found specified account of the social application as the characteristic information of the promotion information;

if the specified account of the social application is not found, determining a type of the one or more of the terminals;

when the one or more of the terminals is a fixed terminal, determining address information of the one or more of the terminals as the characteristic information of the promotion information; and when the one or more of the terminals is a mobile terminal, determining a mobile terminal identifier of the one or more of the terminals as the characteristic information of the promotion information.

11. A system comprising a monitoring server and one or more terminals, the monitoring server comprising:

one or more processing circuits, and a first memory connected with the one or more processing circuits, the first memory being configured to store instructions executable by the one or more processing circuits, wherein the one or more processing circuits are configured to execute the instructions stored in the first memory, comprising instructions configured to execute operations including:

acquiring, by the monitoring server, characteristic information sent by multiple terminals to obtain multiple pieces of characteristic information, the multiple pieces of characteristic information being obtained by monitoring promotion information by the multiple terminals respectively and the multiple pieces of characteristic information comprising specified accounts of a social application or terminal information, wherein the promotion information is obtained from the multiple terminals when the multiple terminals have stored the promotion information, or from a promotion information server when the terminals have not yet stored the promotion information;

making statistics, by the monitoring server, on a total number of exposures of and a total number of clicks on the promotion information based on the multiple pieces of characteristic information, wherein making statistics on the total number of exposures of the promotion information comprises: determining, by the one or more processing circuits, that the promotion information is exposed once every time when a piece of the characteristic information is received from one of the multiple terminals, and increasing the total number of exposures by one; and each characteristic information includes a number of clicking operations, wherein making statistics on the total number of clicks on the promotion information comprises: summing a previous total number of clicks and a total number of clicking operations included in one or more pieces of received characteristic information;

determining, by the monitoring server, based on the multiple pieces of characteristic information sent by multiple terminals, user attributes corresponding to the multiple terminals to obtain multiple user attributes;

making statistics, by the monitoring server, on a number of hit exposures of the promotion information based on the multiple user attributes and a target user attribute of the promotion information; and determining, by the monitoring server, effectiveness of placing the promotion information based on the number of hit exposures of the promotion information, the total number of exposures of the promotion information and the total number of clicks on the promotion information according to a following formula:

$$Y=a \times L+(1-a) \times D,$$

where Y is the effectiveness of placing the promotion information, L is a target user coverage rate of the promotion information, a is a weight of the target user coverage rate, and D is a click rate of the promotion information, wherein the target user coverage rate of the promotion information is obtained through dividing the number of hit exposures of the promotion information by the total number of exposures of the promotion information, and the click rate of the promotion information is obtained through dividing the total number of clicks on the promotion information by the total number of exposures of the promotion information;

each of the one or more terminals comprising:

one or more processors, and a second memory connected with the one or more processors of each of the one or more terminals, the second memory of each of the one or more terminals being configured to store instructions executable by the one or more processors of each of the one or more terminals, wherein the one or more processors of each of the one or more terminals are configured to execute the instructions stored in the second memory of each of the one or more terminals, comprising instructions configured to execute the following operation of:

when an instruction for viewing multimedia information is received, displaying, by the one or more terminals on a display screen, promotion information placed in the multimedia information;

acquiring, by the one or more terminals, characteristic information of the promotion information in a display process of the promotion information, the characteristic information comprising a specified account of a social application or terminal information, wherein a total number of exposures of and a total number of clicks on the promotion information and user attributes corresponding to the one or more terminals are determined based on the characteristic information, wherein the number of hit exposures of the promotion information is determined based on the user attributes corresponding to the one or more terminals; and sending, by the one or more terminals, the characteristic information of the promotion information to a monitoring server to enable the monitoring server to determine effectiveness of placing the promotion information based on the number of hit exposures of the promotion information and the total number of exposures of and the total number of clicks on the promotion information.

12. The system according to claim 11, wherein the first memory of the monitoring server comprises instructions configured to execute the following operation of:

for each piece of characteristic information among the multiple pieces of characteristic information, determining a target specified account of the social application based on the characteristic information; and acquiring the user attributes corresponding to the multiple terminals from stored correspondences between specified accounts of the social application and user attributes based on the target specified accounts of the social application.

13. The system according to claim 12, wherein the first memory of the monitoring server comprises instructions configured to execute the following operation of:

when the characteristic information is address information of a corresponding terminal, acquiring, based on the address information, at least one specified account of the social application and a number of times that the at least one specified account of the social application has been logged on, from stored correspondences among address information, specified accounts of the social application and login times;

selecting a specified account of the social application of which the login times is greatest from the at least one specified account of the social application; and determining the selected specified account of the social application as the target specified account of the social application.

14. The system according to claim 12, wherein the first memory of the monitoring server comprises instructions configured to execute the following operation of:

when the characteristic information is a mobile terminal identifier of a corresponding terminal, acquiring, based on the mobile terminal identifier, at least one specified account of the social application and a timestamp of the at least one specified account of the social application from stored correspondences among mobile terminal identifiers, specified accounts of the social application and timestamps;

selecting a specified account of the social application of which the timestamp is closest to current time from the at least one specified account of the social application; and determining the selected specified account of the social application as the target specified account of the social application.

15. The system according to claim 12, wherein the first memory of the monitoring server comprises instructions configured to execute the following operation of:

when the characteristic information is a mobile terminal identifier of a corresponding terminal, acquiring, based on the mobile terminal identifier, at least one specified account of the social application and a number of times that the at least one specified account of the social application has been logged on, from stored correspondences among mobile terminal identifiers, specified accounts of the social application and login times;

selecting a specified account of the social application of which the login times is greatest from the at least one specified account of the social application; and determining the selected specified account of the social application as the target specified account of the social application.

16. The system according to claim 12, wherein the first memory of the monitoring server comprises instructions configured to execute the following operation of:

when the characteristic information is a specified account of the social application, determining the specified account of the social application as the target specified account of the social application.

17. The system according to claim 11, wherein the first memory of the monitoring server comprises instructions configured to execute the following operation of:

dividing the number of hit exposures of the promotion information by the total number of exposures of the promotion information to obtain a target user coverage rate of the promotion information;

dividing the total number of clicks on the promotion information by the total number of exposures of the promotion information to obtain a click rate of the promotion information;

calculating a placing effectiveness index of the promotion information based on the target user coverage rate of the promotion information and the click rate of the promotion information; and determining the effectiveness of placing the promotion information based on the placing effectiveness index of the promotion information.

18. The system according to claim 11, wherein the first memory of the monitoring server comprises instructions configured to execute the following operation of:

when an attribute setting instruction is received, displaying a user attribute list;

receiving an attribute selection instruction, the attribute selection instruction carrying a user attribute selected from the user attribute list by an information promoter; and determining the selected user attribute as the target user attribute.

19. The method according to claim 1, wherein the weight of the target user coverage rate is regulated along with increase of a placing time length of the promotion information.

* * * * *